US012438991B2

(12) United States Patent
Usami et al.

(10) Patent No.: US 12,438,991 B2
(45) Date of Patent: Oct. 7, 2025

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Kenta Usami, Ibaraki (JP); Masahiro Kajimoto, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 18/504,996

(22) Filed: Nov. 8, 2023

(65) Prior Publication Data

US 2024/0163378 A1 May 16, 2024

(30) Foreign Application Priority Data

Nov. 10, 2022 (JP) .................................. 2022-180026

(51) Int. Cl.
*G06F 15/00* (2006.01)
*H04L 51/043* (2022.01)
*H04N 1/00* (2006.01)

(52) U.S. Cl.
CPC ....... *H04N 1/00214* (2013.01); *H04L 51/043* (2013.01); *H04N 1/00225* (2013.01); *H04N 1/00244* (2013.01)

(58) Field of Classification Search
None
See application file for complete search history.

(56) References Cited

U.S. PATENT DOCUMENTS

| | | | | |
|---|---|---|---|---|
| 10,237,210 | B2 * | 3/2019 | Shimomoto | H04L 51/04 |
| 11,399,116 | B2 * | 7/2022 | Hasegawa | H04N 1/4426 |
| 2008/0136897 | A1 * | 6/2008 | Morishima | H04N 7/15 |
| | | | | 348/E7.083 |
| 2013/0067339 | A1 * | 3/2013 | Appelman | G06F 3/0482 |
| | | | | 715/739 |
| 2016/0269327 | A1 * | 9/2016 | Hasegawa | H04L 51/043 |
| 2021/0144266 | A1 * | 5/2021 | Tsukada | H04N 1/00241 |
| 2021/0195060 | A1 * | 6/2021 | Hasegawa | H04L 51/046 |

(Continued)

FOREIGN PATENT DOCUMENTS

| | | |
|---|---|---|
| JP | 2021078084 A | 5/2021 |
| WO | 2018104834 A1 | 6/2018 |

*Primary Examiner* — Mark R Milia
(74) *Attorney, Agent, or Firm* — Canon U.S.A., Inc., IP Division

(57) ABSTRACT

A scan apparatus includes a scan unit configured to scan a document and generate image data, a reception unit configured to receive status information indicating a status of a user from a chat server, and a transmission unit configured to transmit the image data generated by the scan unit and information about a posting destination to the chat server, wherein the image data transmitted by the transmission unit is posted to the posting destination corresponding to the information transmitted by the transmission unit, wherein the transmission unit is configured to, while the status of a user corresponding to the posting destination is offline, not transmit the image data or the information, and wherein the transmission unit is configured to, if the reception unit receives status information indicating a responsive status of the user corresponding to the posting destination, transmit the image data and the information.

14 Claims, 20 Drawing Sheets

(56) References Cited

U.S. PATENT DOCUMENTS

| | | | |
|---|---|---|---|
| 2021/0266421 A1* | 8/2021 | Osuki | H04N 1/32566 |
| 2021/0409556 A1* | 12/2021 | Ushinohama | H04N 1/00212 |
| 2021/0409558 A1* | 12/2021 | Tsukada | H04N 1/32106 |
| 2022/0174126 A1* | 6/2022 | Nakagawa | H04L 67/54 |
| 2022/0256042 A1* | 8/2022 | Tsukada | H04N 1/00241 |

* cited by examiner

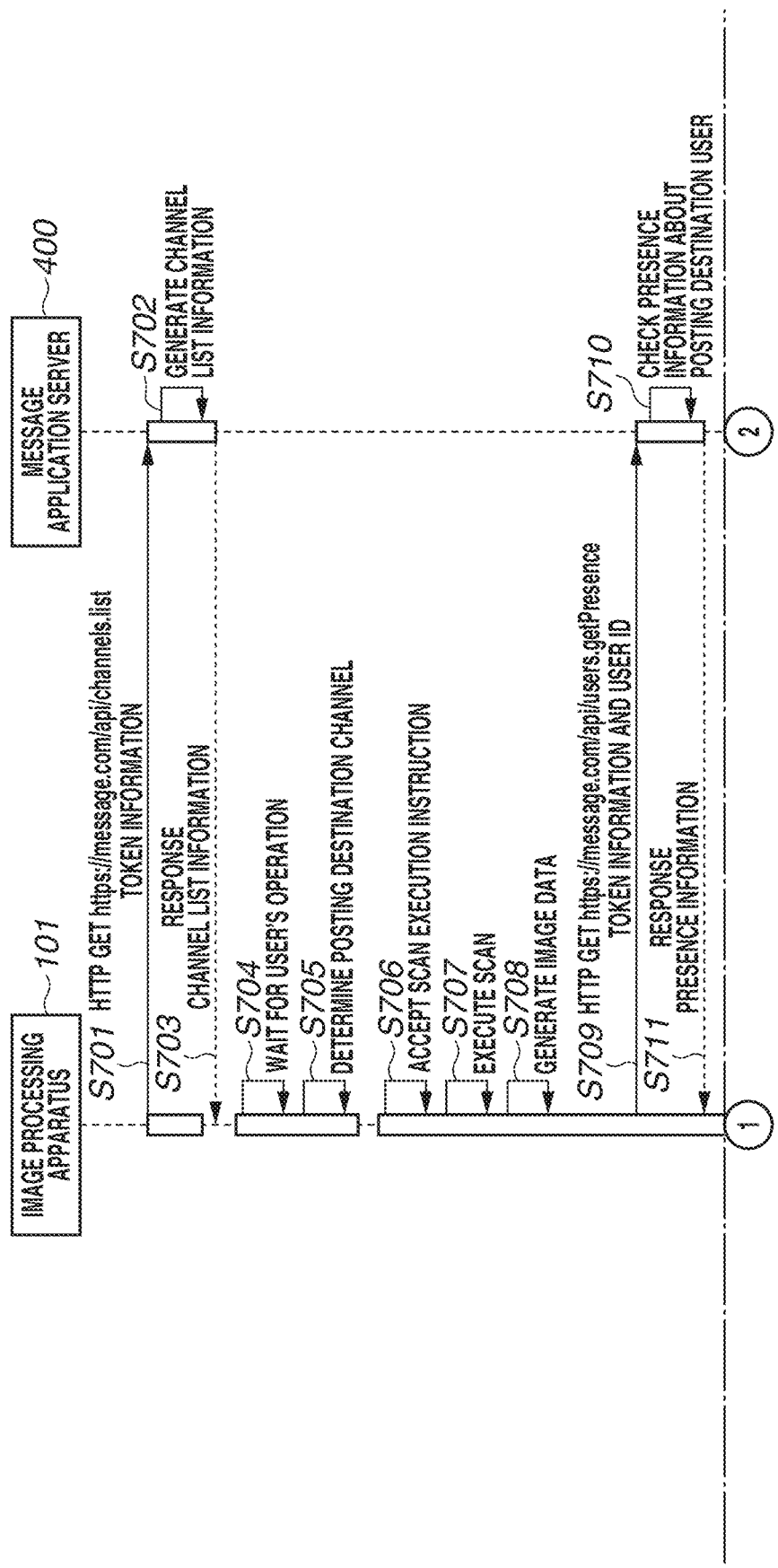

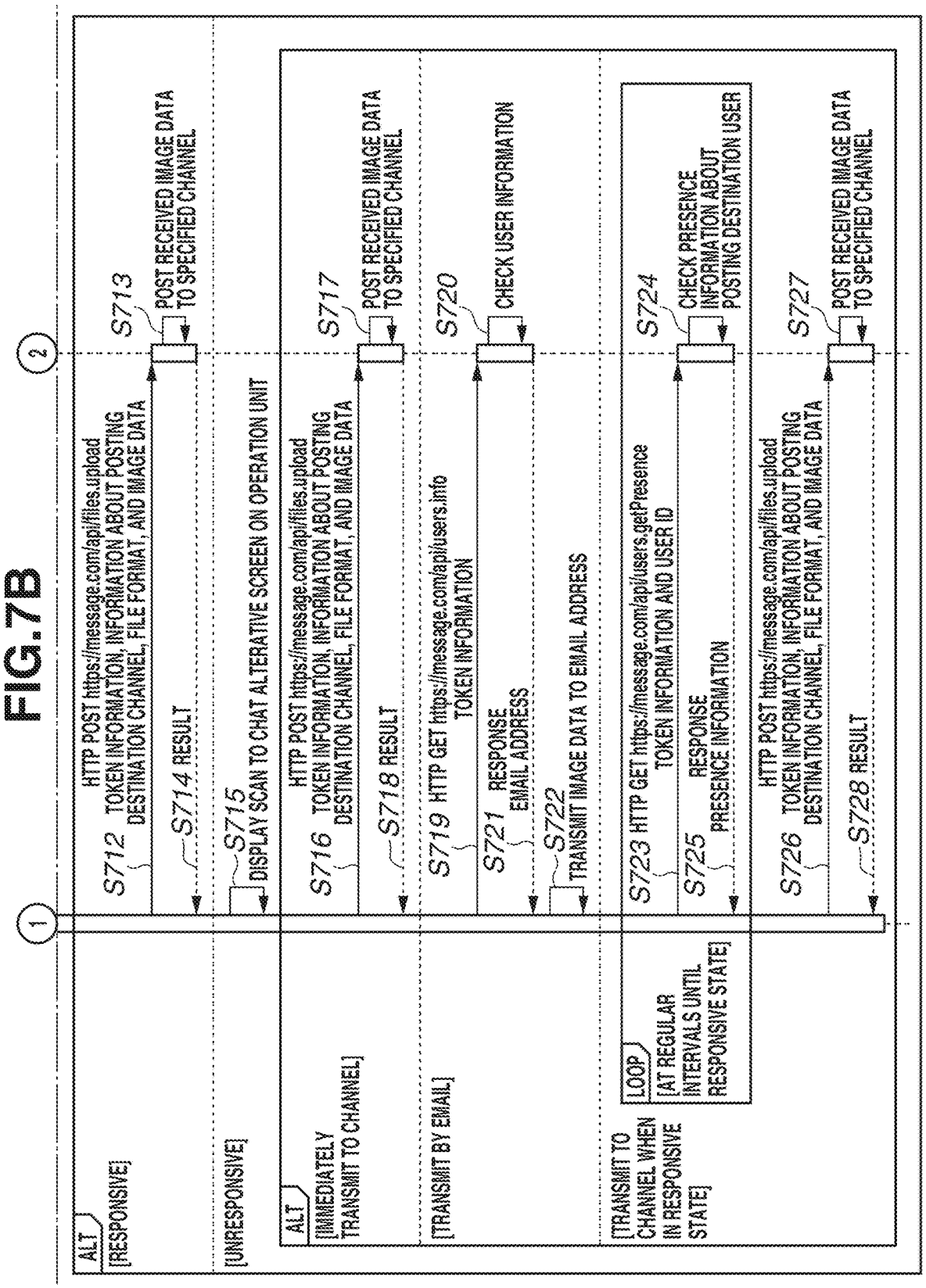

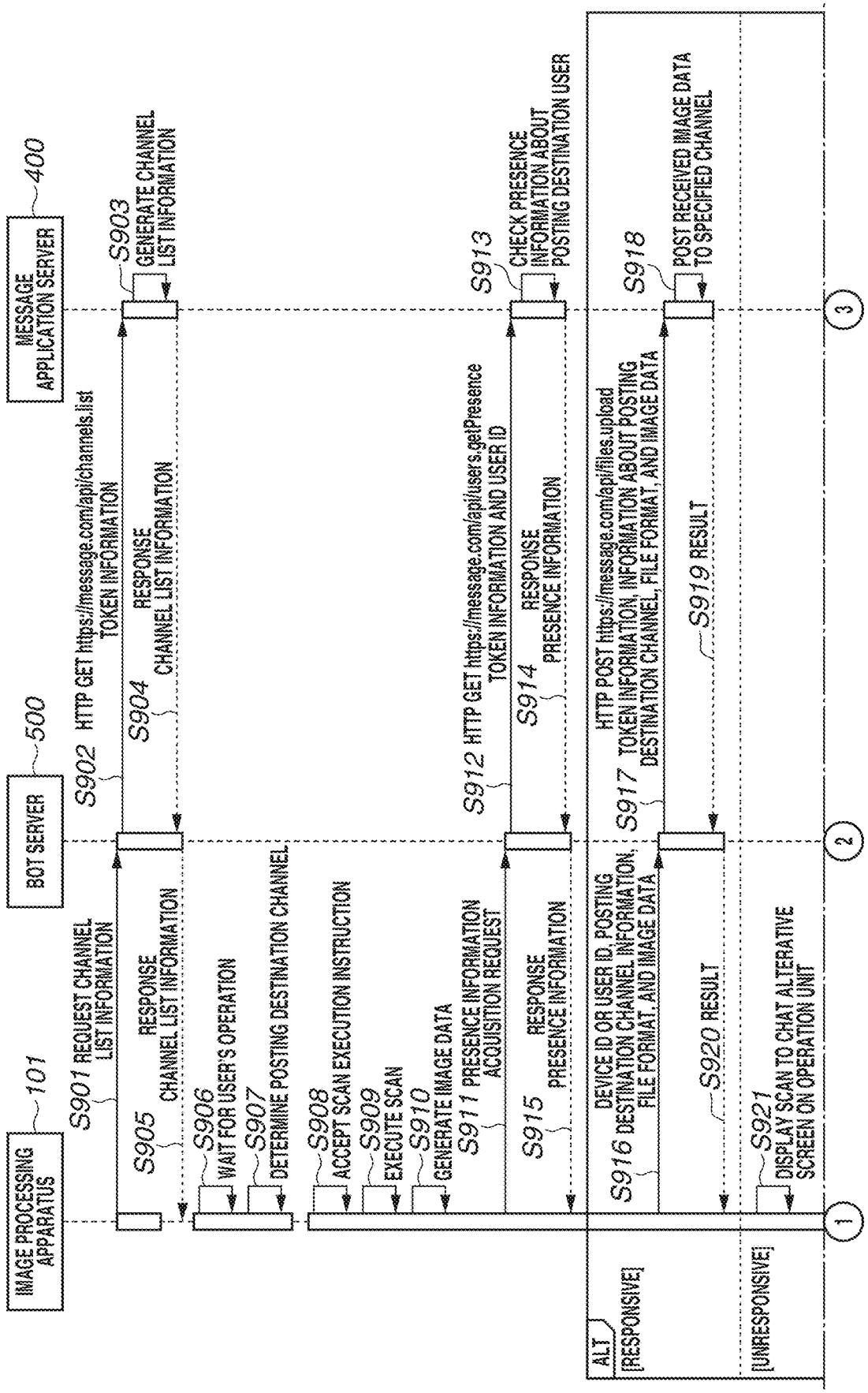

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium.

Description of the Related Art

Japanese Patent Application Laid-Open No. 2021-078084 discusses an image processing apparatus that transmits image data generated by scanning a document image to a message application server providing a chat service.

A chat service includes a function of presenting a user's status called presence.

According to Japanese Patent Application Laid-Open No. 2021-078084, the image data generated by the image processing apparatus scanning a document image can be uploaded to a channel. However, if the transmission destination user is not logged in to the chat service or away for a long time, the user is less likely to notice the posted image data.

SUMMARY OF THE INVENTION

The present invention is directed to making image data generated by an image processing apparatus reading a document image and posted to a chat service more noticeable to a transmission destination user.

According to an aspect of the present invention, a scan apparatus includes a scan unit configured to scan a document and generate image data, a reception unit configured to receive status information indicating a status of a user from a chat server, and a transmission unit configured to transmit the image data generated by the scan unit and information about a posting destination to the chat server, wherein the image data transmitted by the transmission unit is posted to the posting destination corresponding to the information transmitted by the transmission unit, the posting destination being of a chat service provided by the chat server, wherein the transmission unit is configured to, while the status of a user corresponding to the posting destination is offline, not transmit the image data or the information, the status being indicated by the received status information, and wherein the transmission unit is configured to, if the reception unit receives status information indicating a responsive status of the user corresponding to the posting destination, transmit the image data and the information.

Further features of the present invention will become apparent from the following description of exemplary embodiments with reference to the attached drawings.

BRIEF DESCRIPTION OF THE DRAWINGS

FIGS. 7A and 7B are diagrams illustrating an example of a sequence where the image processing apparatus transmits a file generated by a scan to the message application server.

FIGS. 9A and 9B are diagrams illustrating an example of a sequence where an image processing apparatus transmits a file generated by a scan to a message application server via a bot server.

DESCRIPTION OF THE EMBODIMENTS

Exemplary embodiments of the present invention will be described below with reference to the drawings. Configurations described in the following exemplary embodiments are just examples, and the present invention is not limited to the illustrated configurations.

A first exemplary embodiment will be described. An image processing apparatus as an exemplary embodiment of an information processing apparatus according to the present invention will be described.

Figure 1:
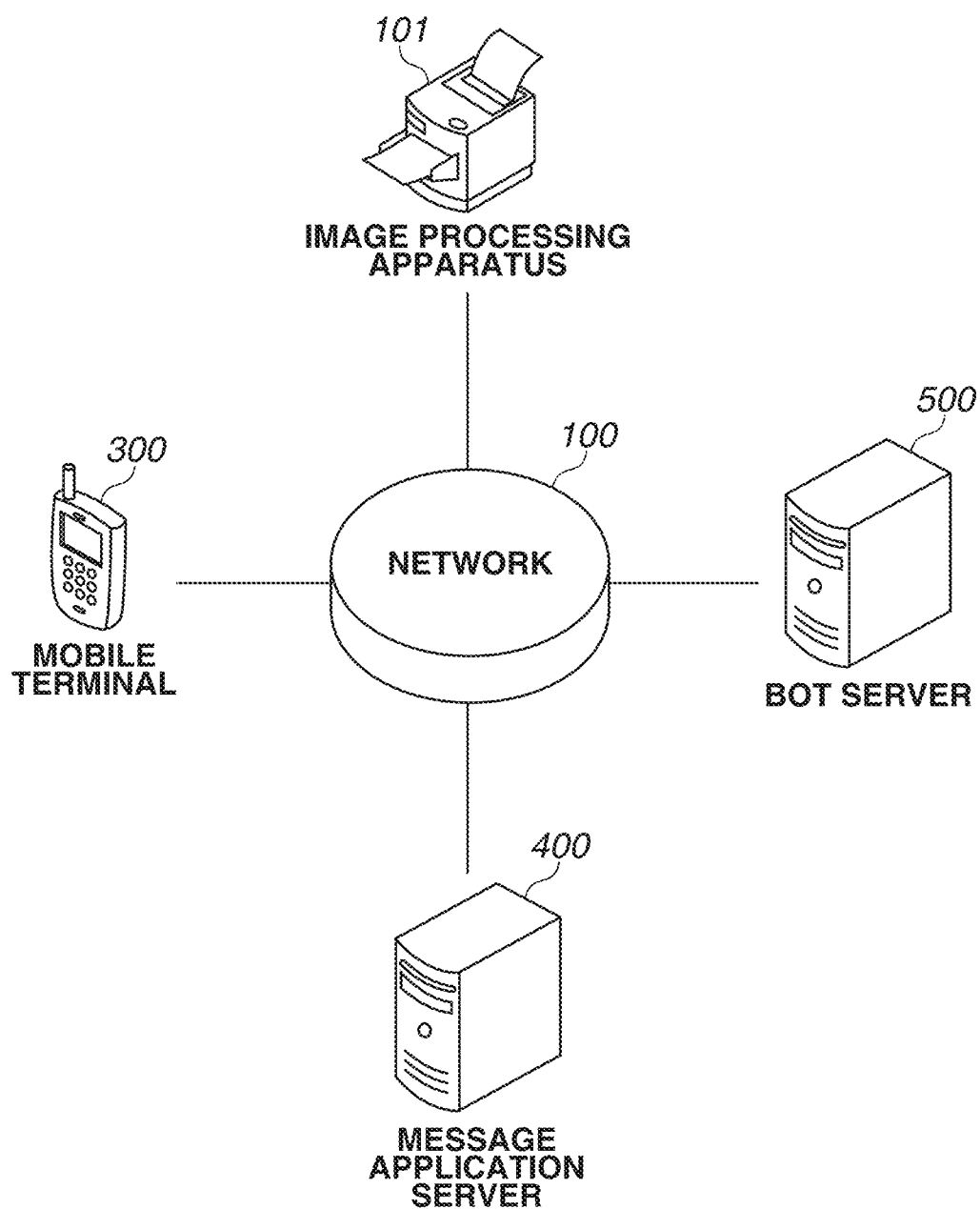
FIG. 1 is a diagram illustrating an example of a system configuration according to an exemplary embodiment of the present invention.

FIG. 1 is a diagram illustrating an example of a system configuration of the present exemplary embodiment. The system configuration of the present exemplary embodiment includes a mobile terminal 300 that is an example of a terminal device, an image processing apparatus 101 and a message application server 400 that can communicate via a network 100. A bot server 500 is also connected and can communicate via the network 100. The message application server 400 is a chat server that provides a chat service for receiving messages and image data transmitted from the image processing apparatus 101 and the mobile terminal 300 and displaying the messages and the image data on the mobile terminal 300 and a not-illustrated personal computer (PC) based on user operations. The bot server 500 links the image processing apparatus 101 with information (token information) corresponding to a bot application installed on the connected message application server 400, and transfers requests from the image processing apparatus 101 to the message application server 400. The network 100 according to the present exemplary embodiment may be the Internet or a local area network (LAN). The network 100 may be a wired or wireless network.

Figure 2:
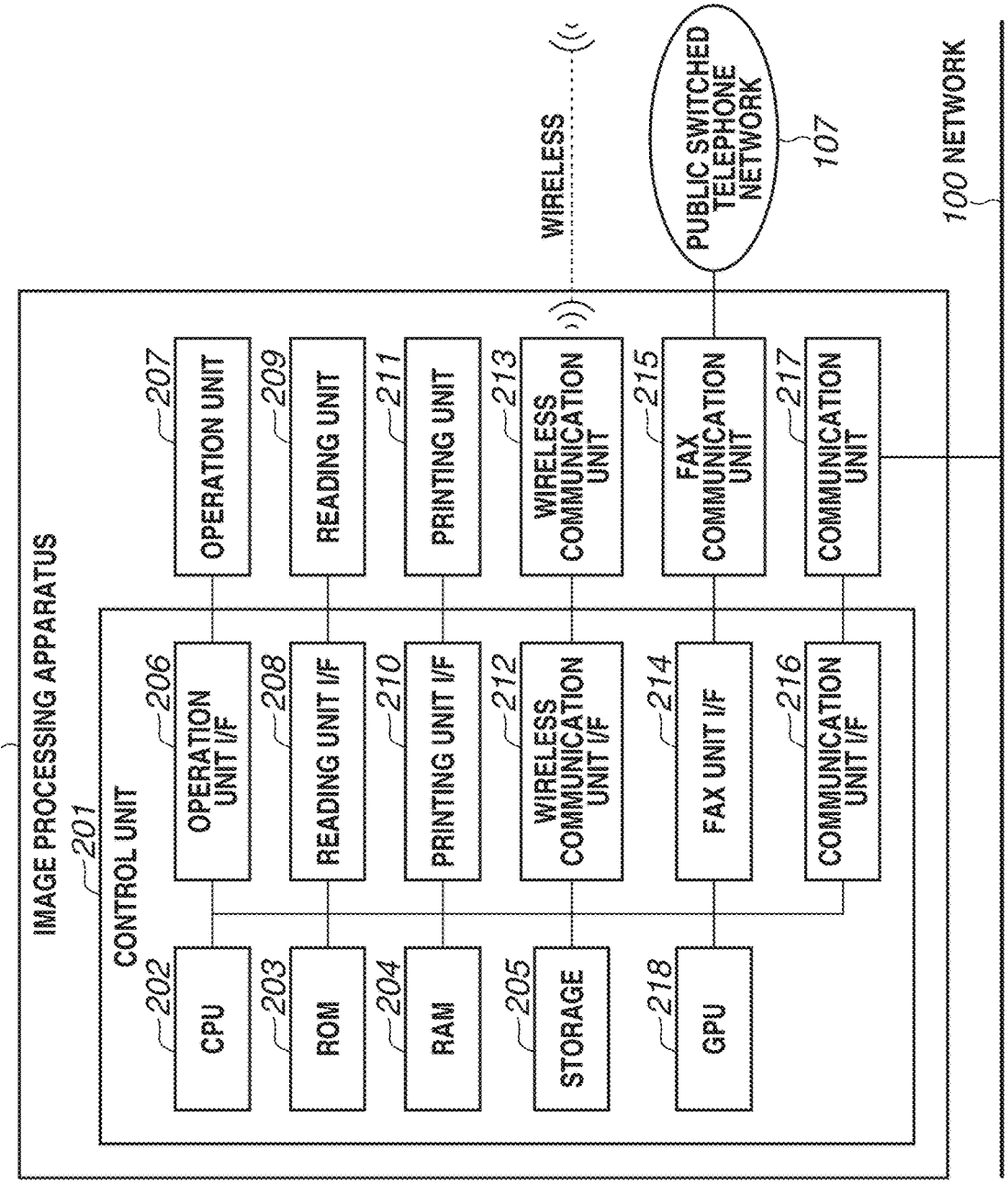
FIG. 2 is a diagram illustrating an example of a hardware configuration of an image processing apparatus.

As illustrated in FIG. 2, the image processing apparatus 101 includes a central processing unit (CPU) 202, a read-only memory (ROM) 203, a random access memory (RAM) 204, a storage 205, an operation unit interface (I/F) 206, an operation unit 207, a reading unit I/F 208, a reading unit 209, a printing unit I/F 210, a printing unit 211, a wireless communication unit I/F 212, and a wireless communication unit 213. The image processing apparatus 101 also includes a facsimile (FAX) unit I/F 214, a FAX communication unit 215, a communication unit I/F 216, a communication unit 217, and a graphics processing unit (GPU) 218.

A control unit 201 including the CPU 202 controls operation of the entire image processing apparatus 101. The CPU 202 reads control programs stored in the ROM 203 or the storage 205 into the RAM 204, and performs various types of control such as read control and print control. The ROM 203 stores control programs executable by the CPU 202. The ROM 203 also stores a boot program and font data. The RAM 204 is a main storage memory, and used as a work area and a temporary storage area for loading various control programs stored in the ROM 203 and the storage 205. The storage 205 stores image data, print data, various programs, and various types of setting information. In the present exemplary embodiment, the storage 205 is assumed to be a flash memory. However, auxiliary storage devices such as a solid-state drive (SSD) and a hard disc drive (HDD) may be used. An embedded MultiMediaCard (eMMC) may be used.

The image processing apparatus 101 according to the present exemplary embodiment is described to perform processes illustrated in the flowchart to be described below by one CPU 202 using one memory (RAM 204). However, this is not restrictive. For example, the processes illustrated in the flowchart to be described below may be performed through cooperation of a plurality of CPUs, RAMs, ROMs, and storages. Some of the processes may be performed using a hardware circuit such as an application-specific integrated circuit (ASIC) and a field-programmable gate array (FPGA).

The operation unit I/F 206 connects the operation unit 207 including a display unit, such as a touchscreen, and hardware keys with the control unit 201. The operation unit 207 displays information to the user and detects input from the user.

The reading unit I/F 208 connects the reading unit 209, such as a scanner, with the control unit 201. The reading unit 209 reads a document image, and the CPU 202 converts the image into image data such as binary data. The image data generated based on the image read by the reading unit 209 is transmitted to an external apparatus or printed on a recording sheet. The reading unit 209 included in a scan unit can scan a plurality of documents placed on a not-illustrated automatic document feeder (ADF) and generate a plurality of pieces of image data. In such a case, the documents placed on the ADF are conveyed by the ADF for scanning.

The printing unit I/F 210 connects the printing unit 211, such as a printer, with the control unit 201. The CPU 202 transfers image data (print data) stored in the RAM 204 to the printing unit 211 via the printing unit I/F 210. The printing unit 211 prints an image based on the transferred image data on a recording sheet fed from a feed cassette.

The wireless communication unit I/F 212 is an I/F for controlling the wireless communication unit 213. The wireless communication unit I/F 212 connects the control unit 201 with an external wireless device (here, mobile terminal 300) via wireless communication.

The control unit 201 is connected to a public switched telephone network 107 by the FAX unit I/F 214 controlling the FAX communication unit 215 such as a FAX machine. The FAX unit I/F 214 is an I/F for controlling the FAX communication unit 215, and can connect to the public switched telephone network 107 and control a FAX communication protocol by controlling a FAX communication modem or network control unit (NCU).

The communication unit I/F 216 connects the control unit 201 with the network 100. The communication unit I/F 216 transmits image data and various types of information inside the image processing apparatus 101 to an external apparatus on the network 100 and receives print data from an information processing apparatus on the network 100 and information on the network 100 via the communication unit 217. Possible methods of transmission and reception via the network 100 include transmission and reception using emails, and file transmission using other protocols (such as the File Transfer Protocol [FTP], Server Message Block (SMB), and Web Distributed Authoring and Versioning [WebDAV]). The communication unit I/F 216 can also transmit and receive image data and various types of setting data over the network 100 through Hypertext Transfer Protocol (HTTP) communication accesses from the mobile terminal 300, the message application server 400, and the bot server 500.

Figure 3:
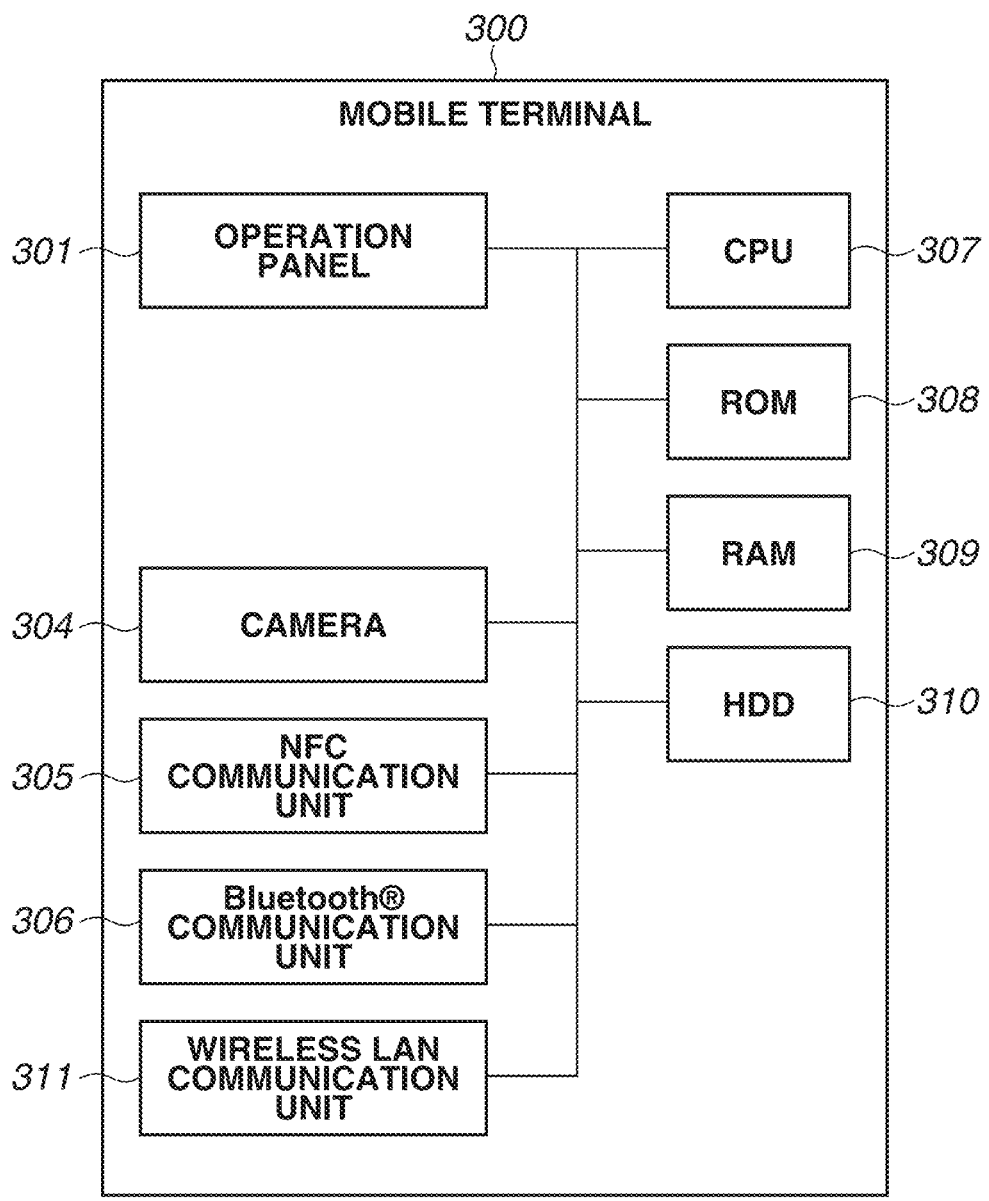
FIG. 3 is a diagram illustrating an example of a hardware configuration of a mobile terminal.

FIG. 3 is a diagram illustrating an example of a hardware configuration of the mobile terminal 300. While the mobile terminal 300 according to the present exemplary embodiment is assumed to be a device such as a smartphone and a tablet PC, other information processing apparatuses capable of Wireless Fidelity (Wi-Fi) communication may be used.

A CPU 307 reads a control program stored in a ROM 308 and performs various types of processing for controlling operation of the mobile terminal 300. The ROM 308 stores the control program. The RAM 309 is used as a temporary storage area such as a main memory and a work area of the CPU 307. An HDD 310 stores various types of data including photographs and electronic documents.

An operation panel 301 has a touchscreen function capable of detecting the user's touch operations, and displays various screens provided by an operating system (OS) and an email transmission application. The operation panel 301 is also used to check information stored in the message application server 400. The user can input desired operation instructions to the mobile terminal 300 by inputting touch operations to the operation panel 301. The mobile terminal 300 also includes not-illustrated hardware keys, and the user can input operation instructions to the mobile terminal 300 using the hardware keys.

A camera 304 captures an image based on the user's imaging instructions. Photographs captured by the camera 304 are stored in a predetermined area of the HDD 310. Using a program capable of analyzing a Quick Response (QR) code (registered trademark), information can be acquired from a QR code read by the camera 304.

The mobile terminal 300 can exchange data with various peripheral devices via a near-field communication (NFC) communication unit 305, a Bluetooth® communication unit 306, and a wireless LAN communication unit 311. The Bluetooth® communication unit 306 of the mobile terminal 300 may support Bluetooth® Low Energy.

Figure 4:
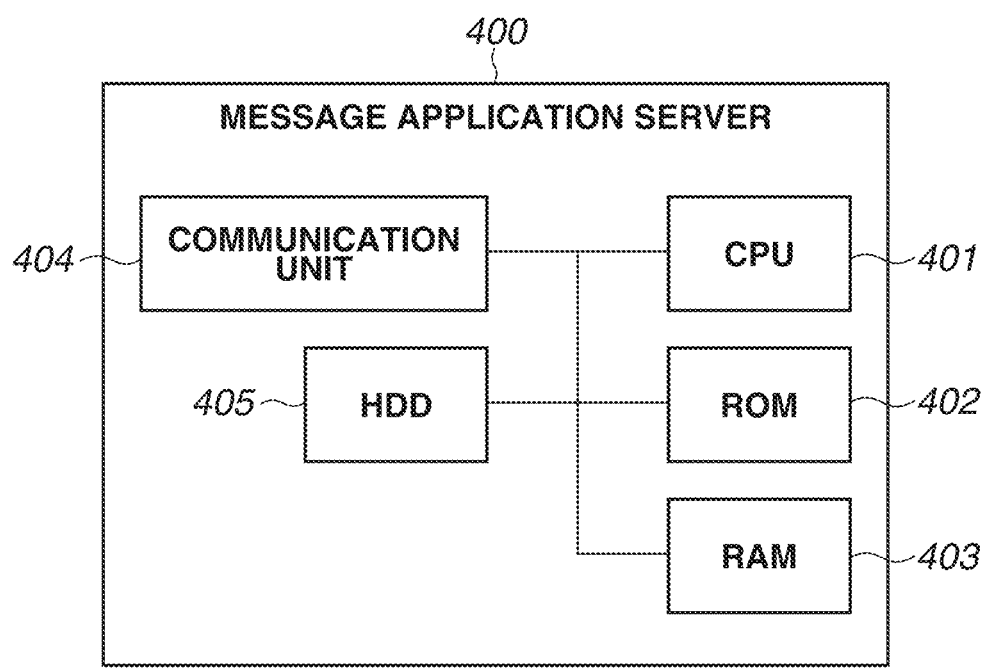
FIG. 4 is a diagram illustrating an example of a hardware configuration of a message application server.

FIG. 4 is a diagram illustrating an example of a hardware configuration of the message application server 400. A CPU 401 reads a control program stored in a ROM 402 and performs various types of processing for controlling operation of the message application server 400. The ROM 402 stores the control program. A RAM 403 is used as a temporary storage area such as a main memory and a work area of the CPU 401. An HDD 405 stores various types of data including messages, image data, and channel information. The message application server 400 can transmit and receive data to/from various apparatuses such as the mobile terminal 300, the image processing apparatus 101, and the bot server 500 via a communication unit 404. The communication unit 404 may perform wired communication using Ethernet (registered trademark), or wireless communication such as Wi-Fi communication.

Figure 5:
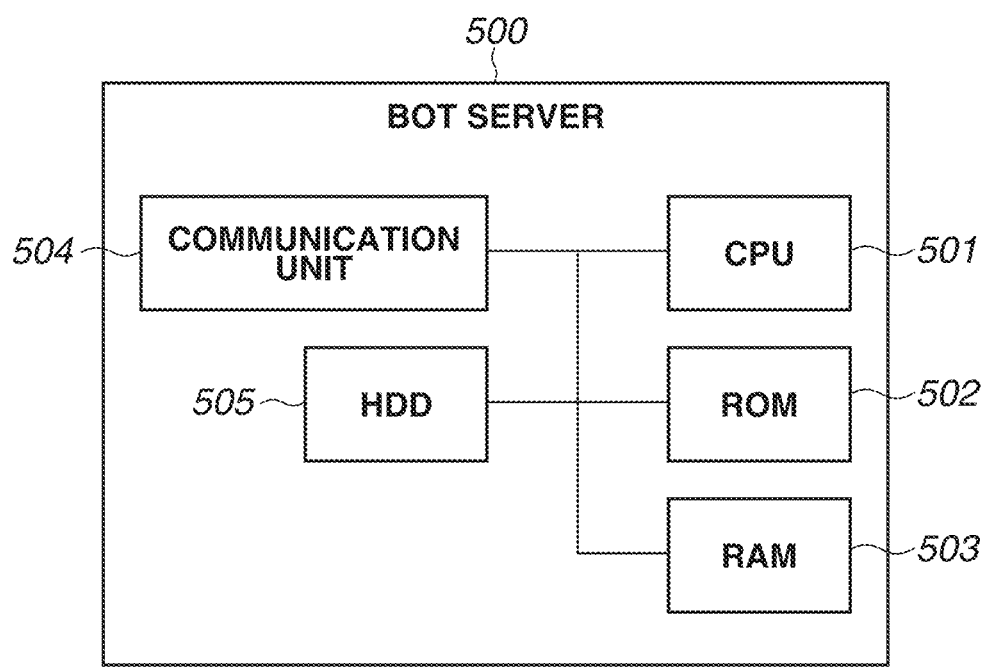
FIG. 5 is a diagram illustrating an example of a hardware configuration of a bot server.

FIG. 5 is a diagram illustrating an example of a hardware configuration of the bot server 500. A CPU 501 reads a control program stored in a ROM 502 and controls operation of the bot server 500 to perform various types of mediating processing with the message application server 400 in response to requests from the image processing apparatus 101. The ROM 502 stores the control program. A RAM 503 is used as a temporary storage area such as a main memory and a work area of the CPU 501. An HDD 505 stores various types of data including messages, image data, and channel information. The bot server 500 can transmit and receive data to/from various apparatuses such as the mobile terminal 300, the image processing apparatus 101, and the message application server 400 via a communication unit 504.

Figure 6:
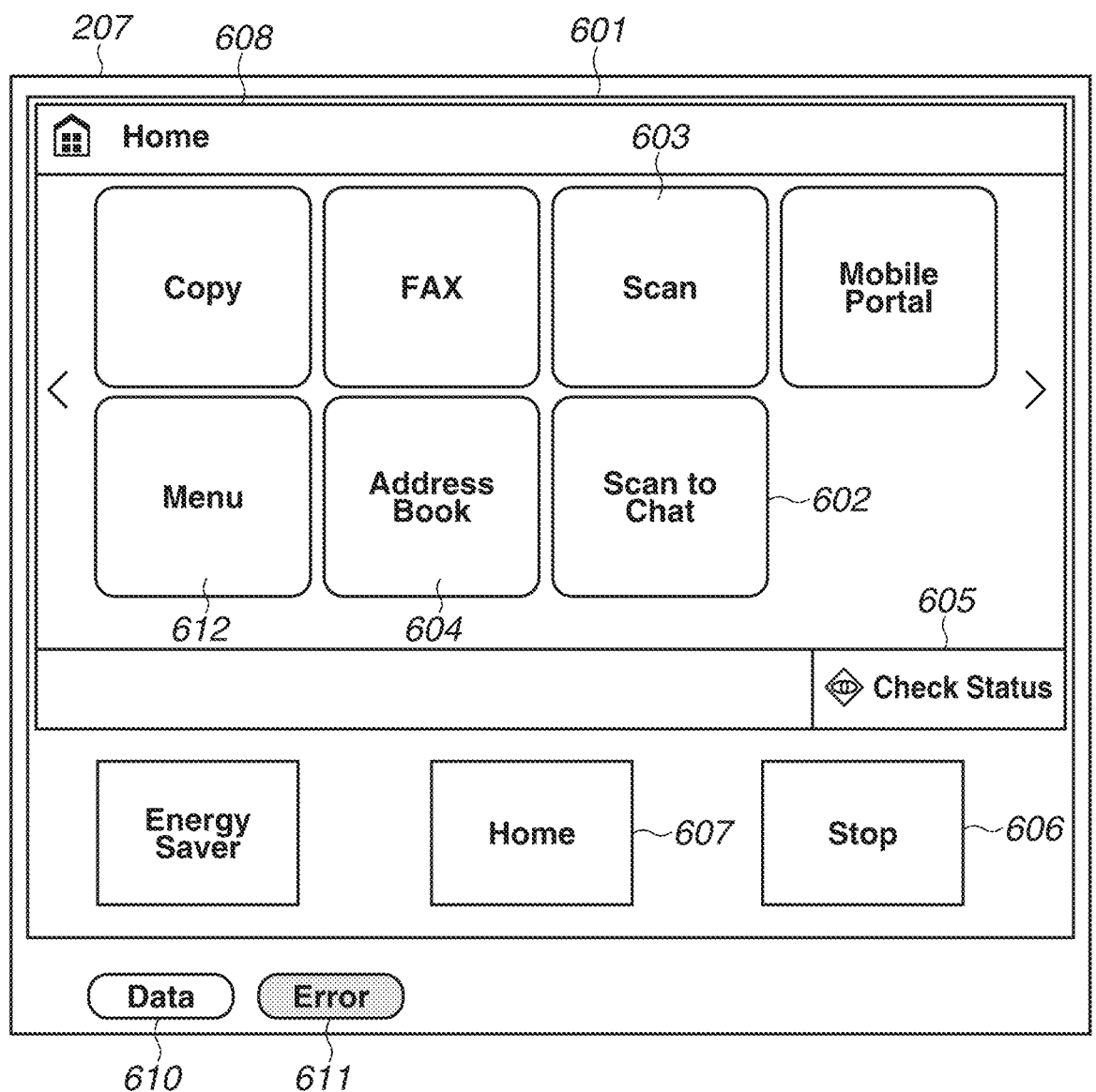
FIG. 6 is a diagram illustrating an example of a home screen displayed on an operation unit of the image processing apparatus.

FIG. 6 is a diagram illustrating an example of a home screen displayed on the operation unit 207 of the image processing apparatus 101. The operation unit 207 includes a touchscreen 601 for displaying an operation screen, and light-emitting diodes (LEDs) 610 and 611. The touchscreen 601 is an instruction unit, and also functions as an acceptance unit for accepting instructions from the user and a display unit for screen display. The user directly touches the screen displayed on the touchscreen 601 with a finger or an object such as a stylus, and thereby gives instructions to perform various functions based on the displayed screen.

The touchscreen 601 illustrated in FIG. 6 displays a home screen 608. The home screen 608 is an initial screen for instructing the image processing apparatus 101 to perform various functions, and selecting a screen display for making various settings intended for the functions for the image processing apparatus 101 to perform, such as a copy, FAX, scan, and media print functions.

A status check button 605 is an object for displaying a screen for checking the state of the image processing apparatus 101 (status check screen). A transmission history and a job execution history can be displayed from the status check screen (not illustrate).

Figure 12A:
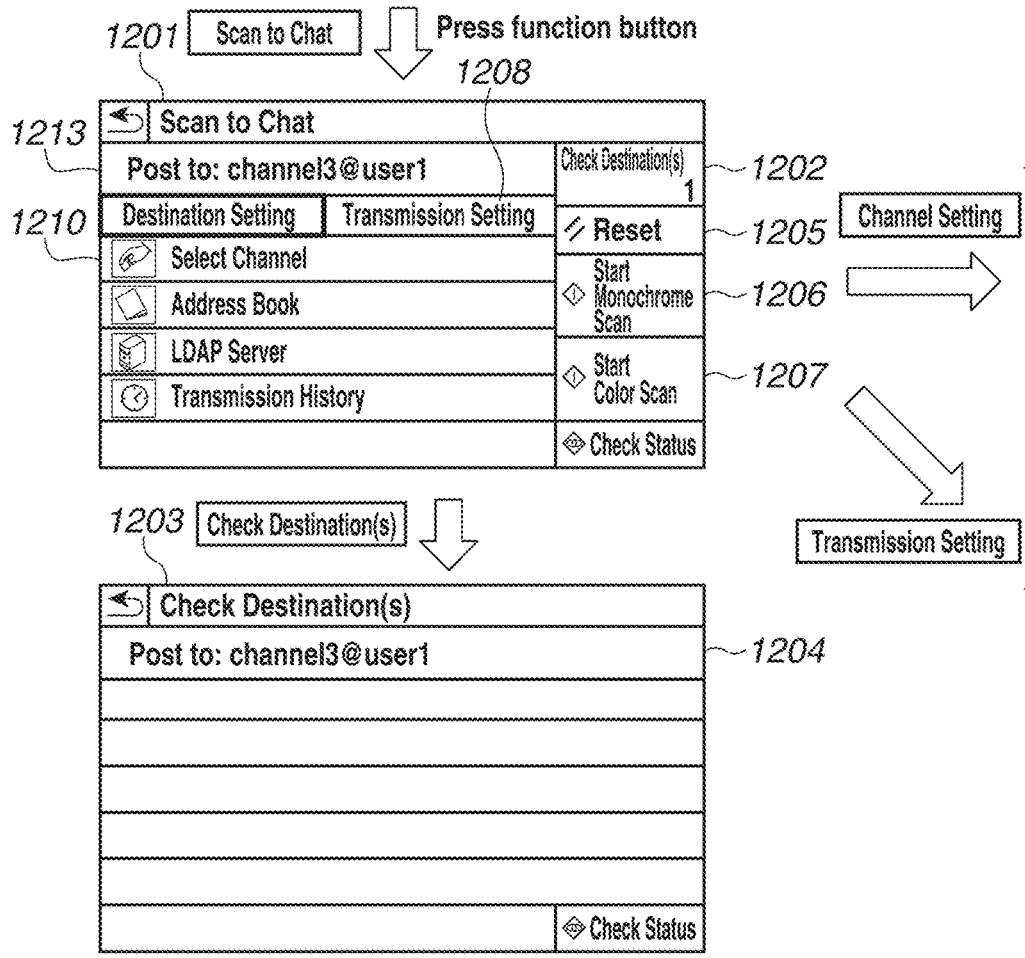
FIGS. 12A and 12B are diagrams illustrating examples of screen transitions in the scan to chat processing.
Figure 12B:
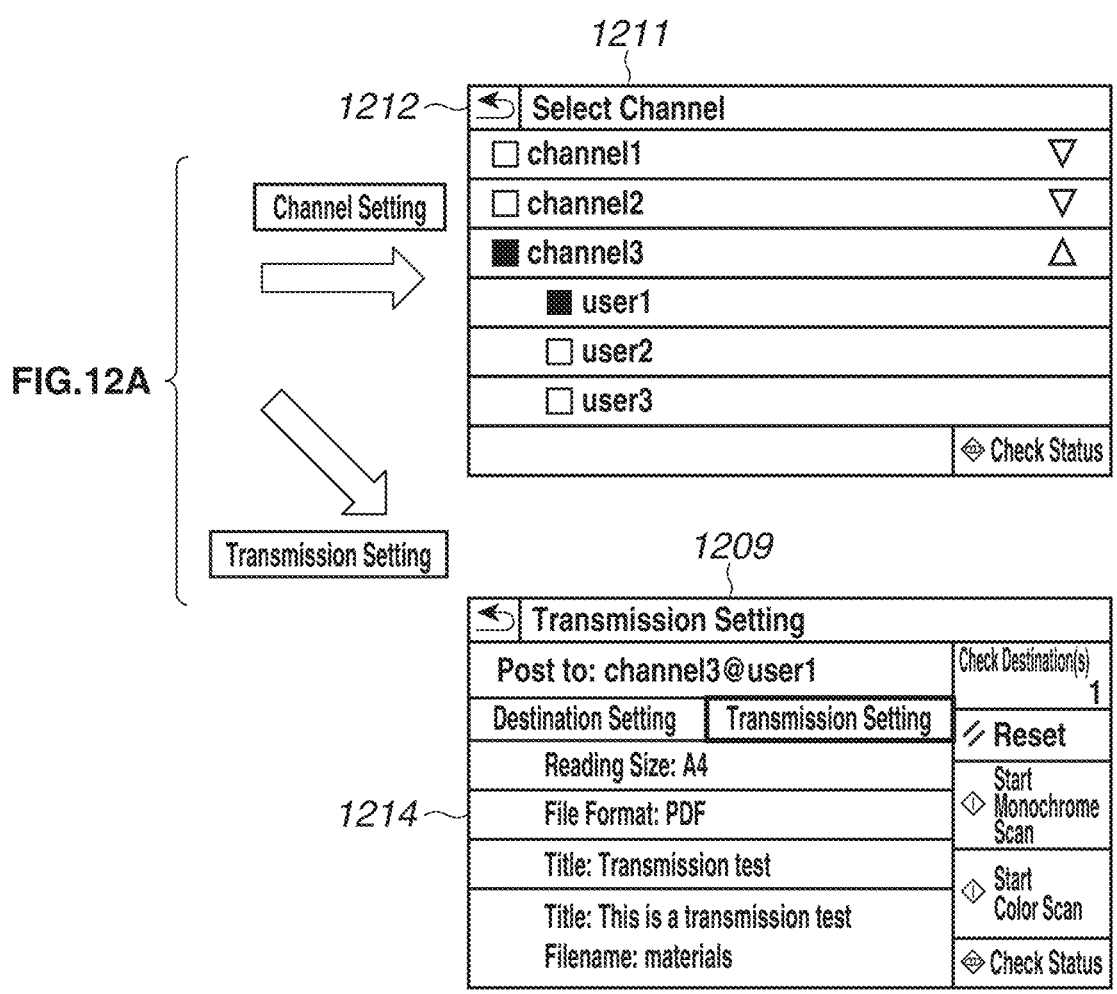

A scan to chat button 602 is an object for displaying a setting screen for scan to chat processing. If the scan to chat button 602 is selected by the user, a scan to chat screen 1201 illustrated in FIG. 12 is displayed on the operation unit 207. The scan to chat processing will be described in detail below with reference to FIGS. 7 and 8.

A scan button 603 is an object for displaying a scan selection screen (not illustrated) from the image processing apparatus 101. The scan selection screen is a screen for selecting transmission functions such as email transmission (email), file transmission using SMB, FTP, and HTTP, and Internet FAX (I-FAX) transmission. The setting screens of the respective transmission functions are displayed by touching displayed objects representing the transmission functions.

An address book button 604 is an object to be selected by the user to display an address book screen of the image processing apparatus 101. The LEDs 610 and 611 are intended to notify the user of the state of the image processing apparatus 101. The LED 610 is lit during reception of an email or print job and during execution of a print job. The LED 611 is lit in the event of an error in the image processing apparatus 101. A stop button 606 is an object for cancelling various operations. The stop button 606 is an object constantly displayed on the operation unit 207. A home button 607 is an object for displaying the home screen 608. The home button 607 is an object constantly displayed on the operation unit 207. A menu button 612 is an object for displaying a screen for setting preferences such as a language and making various function settings.

FIGS. 7A and 7B are diagrams illustrating an example of a sequence where the image processing apparatus 101 transmits a file generated by a scan to the message application server 400. The sequence of FIGS. 7A and 7B is started in response to selection of a channel selection button 1210 on the scan to chat screen 1201 of FIG. 12.

In step S701, the CPU 202 of the image processing apparatus 101 requests channel list information from the message application server 400 by HTTP communication via the communication unit 217. Specifically, the CPU 202 transmits token information input to the image processing apparatus 101 and information indicating a request for a list of channels in a workspace indicated by the token information to the message application server 400. An example of a command to be transmitted here is "HTTP GET https://message.com/api/channels.list". This command includes a Uniform Resource Locator (URL) "https://message.com/api/channels.list", which is a URL for accessing the message application server 400. If the token information is transmitted to this URL, the message application server 400 searches for a workspace and a bot application corresponding to the token information. The token information is input by the user via a setting registration screen 1401 of FIG. 14 displayed on the operation unit 207 of the image processing apparatus 101.

As employed herein, a workspace refers to an organization or the like to which a plurality of users belongs in a message application. A channel refers to a chatroom or the like in the workspace. As employed herein, a chatroom is a mechanism by which a plurality of users participating in the chatroom transmits and receives messages to/from each other to communicate as if in a conversation. While in the present exemplary embodiment a channel is described to be a chatroom, the mechanism by which a plurality of users transmits and receives messages to communicate as if in a conversation is not limited thereto. For example, a channel may be a group chat, a room, a talk room, or a group.

As employed herein, the bot application refers to an application for registering the image processing apparatus 101 as a user in the message application and posting messages and image data. The bot application is installed on the message application server 400. If image data is transmitted to the message application server 400 with the bot application specified, the bot application posts the transmitted image data to the message application. The bot application and the token information are stored in the HDD 405 of the message application server 400 in association with each other, and the bot application and the workspace are associated with each other. Receiving the token information from the image processing apparatus 101, the message application server 400 can thus return the information about the workspace associated with the bot application that is associated with the token information. Alternatively, the token information, the bot application, and the workspace may be directly associated. In such a manner, a workspace corresponding to the token information registered in advance (workspace to which the user wants to transmit the image data) can be selected from a large number of workspaces.

In step S702, the CPU 401 of the message application server 400 checks whether the access to the URL is permitted based on the token information received from the image processing apparatus 101 via the communication unit 404. If the access is permitted, the CPU 401 generates channel list information about the channels included in the workspace corresponding to the token information. The channel list information is array information indicating channel information. Each piece of channel information includes a channel identifier (ID), a channel name, information and user IDs indicating users participating in the channel, and channel setting values indicating settings as to whether the channel is an archive channel. The channel list information generated here may include ID information about talk rooms that are not managed as channels and where users can exchange messages on a one-on-one basis. In such a case, a channel selection screen 1211 displays not channel names but the usernames of partner users or a plurality of users participating in the talk rooms. A talk room can be selected by selecting a username.

In step S703, the CPU 401 of the message application server 400 transmits the channel list information to the image processing apparatus 101 via the communication unit 404 as HTTP communication response information.

In step S704, the CPU 202 of the image processing apparatus 101 generates the channel selection screen 1211 based on the channel information included in the received channel list information. If the channel selection button 1210 is selected by the user, the CPU 202 of the image processing apparatus 101 displays the channel selection screen 1211 on the touchscreen 601 of the operation unit 207 and waits for the user's operation. The channel selection screen 1211 will be described below with reference to FIG. 12.

In step S705, if a channel or a one-on-one talk room is selected and a return button 1212 is pressed on the channel selections screen 1211, the CPU 202 of the image processing apparatus 101 determines information about a posting destination channel.

In step S706, the CPU 202 of the image processing apparatus 101 accepts a scan execution instruction via the operation unit 207.

In step S707, the CPU 202 of the image processing apparatus 101 executes a scan with the scan settings at the time of reception of the scan execution instruction.

In step S708, the CPU 202 of the image processing apparatus 101 generates image data of the scanned image in a format set by the scan settings. The scan settings are ones specified by the user on a not-illustrated scan to chat detailed setting screen. The scan settings may be displayed and made on a transmission setting screen 1209 of FIG. 12 along with transmission settings.

In step S709, the CPU 202 of the image processing apparatus 101 issues an acquisition request for presence information about the posting destination user to the message application server 400 by HTTP communication via the communication unit 217. Here, the same token information as in step S701 and the user ID included in the information about the posting destination channel selected in step S705 are transmitted. As employed herein, the presence information is information indicating the state of presence or absence in the channel. The presence information can be checked to see whether the posting destination user can respond to the chat. In the present exemplary embodiment, the information indicating the state of presence or absence in a channel is referred to as presence information. However, this is not restrictive. For example, such information may be called status information or availability confirmation information. Examples of a responsive state in the presence information include "available" and "active".

Examples of an unresponsive state include "busy", "on another line", "at a meeting", "unresponsive", "giving a presentation", "absent", "temporarily absent", "offline", "out", "away", and "sleep mode". In the present exemplary embodiment, the user ID of the user to obtain the presence information about is uniquely determined if the posting destination channel is a one-on-one talk room. In the case of a channel to which a plurality of users belongs and where there is a mentioned user (posting destination user), the user ID of the mentioned user is acquired. The status of the user to share the image data with can thereby be checked before the execution of the processing.

In the case of a channel to which a plurality of users belongs and where there is no mentioned user, the presence information about all the users may be acquired. Alternatively, no presence information about any user needs to be acquired. The presence information about all the users may be acquired even if there is a mentioned user.

In step S710, the CPU 401 of the message application server 400 searches for workspace information and application information registered with the token information received from the image processing apparatus 101 via the communication unit 404. The CPU 401 then checks the presence information about the posting destination user, using the user ID received in step S709.

In step S711, the CPU 401 of the message application server 400 transmits a result corresponding to whether the acquisition of the presence information about the specified user is successful via the communication unit 404. If the acquisition is successful, the CPU 401 also transmits the presence information about the specified user to the image processing apparatus 101 as HTTP communication response information. If the acquisition of the presence is successful, the CPU 202 of the image processing apparatus 101 may display a notification that the presence information is successfully acquired and the presence information about the posting destination user on the operation unit 207. If the acquisition of the presence information is failed, the CPU 202 of the image processing apparatus 101 may display a notification that the acquisition of the presence information is failed on the operation unit 207. Alternatively, the CPU 202 may display no notification if the acquisition of the presence information is successful, and only display a notification of the failed acquisition if the acquisition of the presence information is failed.

If the image processing apparatus 101 successfully acquires the presence information from the message application server 400 in step S711 and the presence information indicates a responsive state (for example, "available" or "active"), the processing of steps S712 to S714 is performed. If the image processing apparatus 101 successfully acquires the presence information from the message application server 400 in step S711 and the presence information indicates an unresponsive state, the processing of step S715 is performed. The processing of step S715 is also performed if the image processing apparatus 101 fails to acquire the presence information from the message application server 400 in step S711. The processing of steps S716 to S718, S719 to S722, or S723 to S728 is then performed depending on the user's operation. In the present exemplary embodiment, if the image processing apparatus 101 fails to acquire the presence information from the message application server 400 in step S711, the presence information is handled as indicating an unresponsive state. However, the presence information may be handled as indicating a responsive state.

In step S712, the CPU 202 of the image processing apparatus 101 transmits the token information of step S701, the information about the posting destination channel selected in step S705, a file format, and the image data generated in step S708 to the message application server 400 via the communication unit 217. The file format is one specified by the user on the scan to chat transmission setting screen 1209.

In step S713, the CPU 401 searches for the workspace information and the application information registered with the token information received from the image processing apparatus 101 via the communication unit 404, and stores the received image data and the channel specified by the channel information in association with each other. In other words, the CPU 401 posts the received image data to the specified channel. If a posting destination user is specified, the CPU 401 further stores the received image data, the channel, and the posting destination user in association with each other. In other words, the specified user is mentioned. As a result, if the user activates the message application on the mobile terminal 300 and specifies the channel to check the content of the conversation in the channel, a screen where the received image data is posted appears. In step S714, the CPU 401 of the message application server 400 transmits the result corresponding to whether the posting is successful to the image processing apparatus 101 via the communication unit 404 as HTTP communication response information. If the posting is successful, the CPU 202 of the image processing apparatus 101 may display a notification that the posting is successful on the operation unit 207. If the posting is failed, the CPU 202 of the image processing apparatus 101 may display a notification that the posting is failed on the operation unit 207. Alternatively, the CPU 202 may display no notification if the posting is successful, and only display a notification of the posting failure if the posting is failed.

In step S715, the image processing apparatus 101 displays a scan to chat alternative screen 1301 on the operation unit 207 since the presence information about the posting destination user indicates an unresponsive state. In the present exemplary embodiment, examples of the alternatives include "immediately transmit to channel", "transmit by email", and "transmit to channel when in responsive state". If the presence information about the user indicates an unresponsive state, the image processing apparatus 101 may transmit the image data by email and display a message that the image data is transmitted by email on the operation unit 207, without displaying the scan to chat alternative screen 1301. If the presence information about the user indicates an unresponsive state, the image processing apparatus 101 may perform processing for posting the image data to the posting destination when in a responsive state (processing for the case where a button 1304 is selected) without displaying the scan to chat alternative screen 1301.

Figure 13:
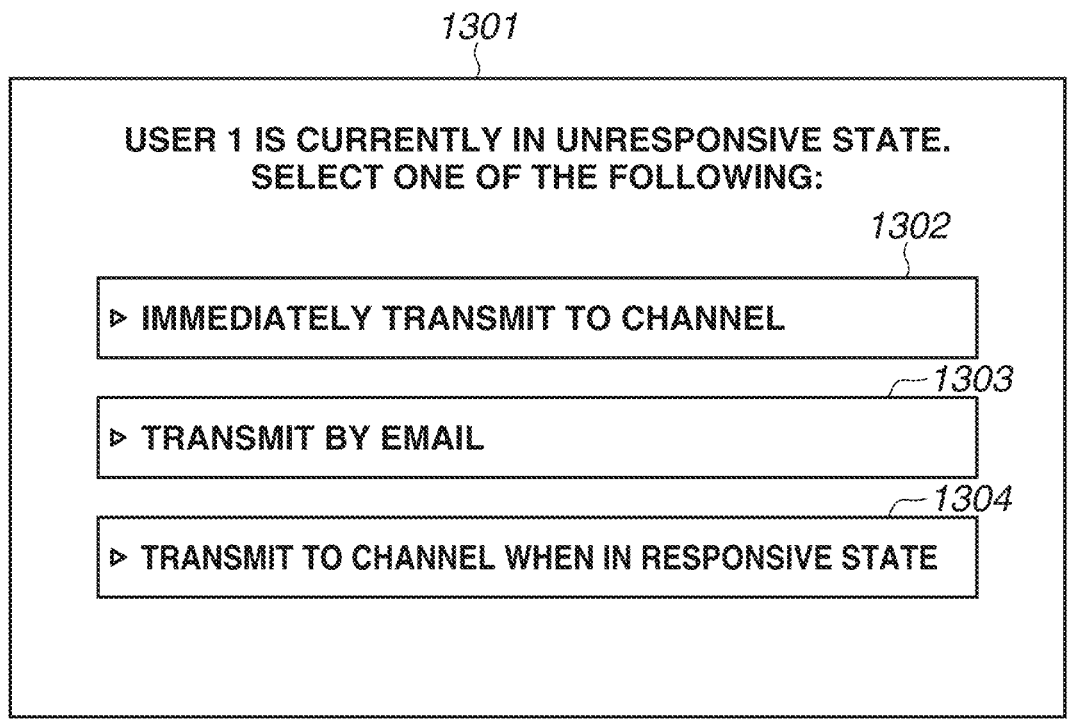
FIG. 13 is a diagram illustrating an example of a scan to chat alternative screen displayed in a case where the presence information about a posting destination indicates an unresponsive state.

FIG. 13 is a diagram illustrating an example of the scan to chat alternative screen 1301. The scan to chat alternative screen 1301 displays buttons 1302 to 1304. If the button 1302 is selected, the image data is immediately posted to the specified posting destination. If the button 1303 is selected, the selected image data is transmitted to a specified email address by email. Here, the email address for the image data to be transmitted to may be that of the user registered in association with user information in the image processing apparatus 101. The image processing apparatus 101 may obtain an email address corresponding to the specified user from the message application server 400. If the button 1303 is selected, an address book stored in the image processing apparatus 101 may be consulted to display an address selection screen on the operation unit 207 and accept selection of an address. Here, an input field for manually inputting an email address may be displayed on the operation unit 207 to accept the user's input. In such a manner, the specification of the address to email can be accepted. A URL for accessing a cloud service where the image data is stored may also be transmitted here. In such a case, the image processing apparatus 101 uploads the image data to the cloud service cooperating with the chat service.

If such processing is performed, the user who is not logged in to the chat service but has access to mail reception can be prompted to check for the image data.

If the button 1304 is selected, the image data is not immediately transmitted in response to the transmission instruction, and posted to the specified posting destination when the posting destination user is in a responsive state. Specifically, the image processing apparatus 101 periodically acquires the presence information about the specified user, and when a responsive state is detected, transmits the information to be transmitted in step S712 to the message application server 400.

If the button 1302 is selected on the scan to chat alternative screen 1301, the processing of steps S716 to S718 is performed. The processing of steps S716 to S718 is similar to that of steps S712 to S714. A description thereof will thus be omitted.

If the button 1303 is selected on the scan to chat alternative screen 1301, the processing of steps S719 to S722 is performed.

In step S719, the CPU 202 issues an acquisition request for the email address of the posting destination user to the message application server 400 via the communication unit 217 by specifying the same token information as in step S701 and the user ID included in the information about the posting destination channel selected in step S705.

In step S720, the CPU 401 of the message application server 400 searches for the workspace information and the application information registered with the token information received via the communication unit 404, and checks the user information about the posting destination user, using the received user ID.

In step S721, the CPU 401 transmits the result corresponding to whether the user information about the posting destination user is successfully acquired and, if the acquisition is successful, the email address included in the user information about the posting destination user to the image processing apparatus 101 as HTTP communication response information. If the acquisition of the user information is successful, the CPU 202 of the image processing apparatus 101 may display a notification that the acquisition of the user information is successful and the email address of the posting destination user on the operation unit 207. If the acquisition of the user information is failed, the CPU 202 of the image processing apparatus 101 may display a notification that the acquisition of the user information is failed on the operation unit 207.

Alternatively, the CPU 202 may display no notification if the acquisition of the user information is successful, and only display a notification that the acquisition of the user information is failed if the acquisition is failed.

If the image processing apparatus 101 successfully acquires the user information from the message application server 400 in step S721, the processing of step S722 is performed.

In step S722, the CPU 202 of the image processing apparatus 101 transmits the image data generated in step S708 to the email address acquired in step S721. Here, the processing of step S712 may also be performed to post the image data to the channel.

If the button 1304 is selected on the scan to chat alternative screen 1301, the processing of steps S723 to S728 is performed.

In steps S723 to S725, the presence information about the posting destination user is repeatedly acquired at regular intervals until the presence information indicates a responsive state. The processing of steps S723 to S725 is similar to that of steps S709 to S711. A description thereof will thus be omitted.

If the presence information about the posting destination user indicates a responsive state in step S725, the processing of steps S726 to S728 is performed. The processing of steps S726 to S728 is similar to that of steps S712 to S714. A description thereof will thus be omitted.

The processing of steps S723 to S728 may be performed on the background in parallel with other operations. If the image processing apparatus 101 transitions to a power saving mode or is powered off before the presence information about the posting destination user becomes a responsive state in step S725, the image data may be transmitted before the transition to the power saving mode or the power-off. In such a manner, if the image processing apparatus 101 becomes unable to transmit the image data to the message application server 400, the image processing apparatus 101 may transmit the image data to the message application server 400 despite the presence information about the posting destination user indicating an unresponsive state.

Figure 8A:
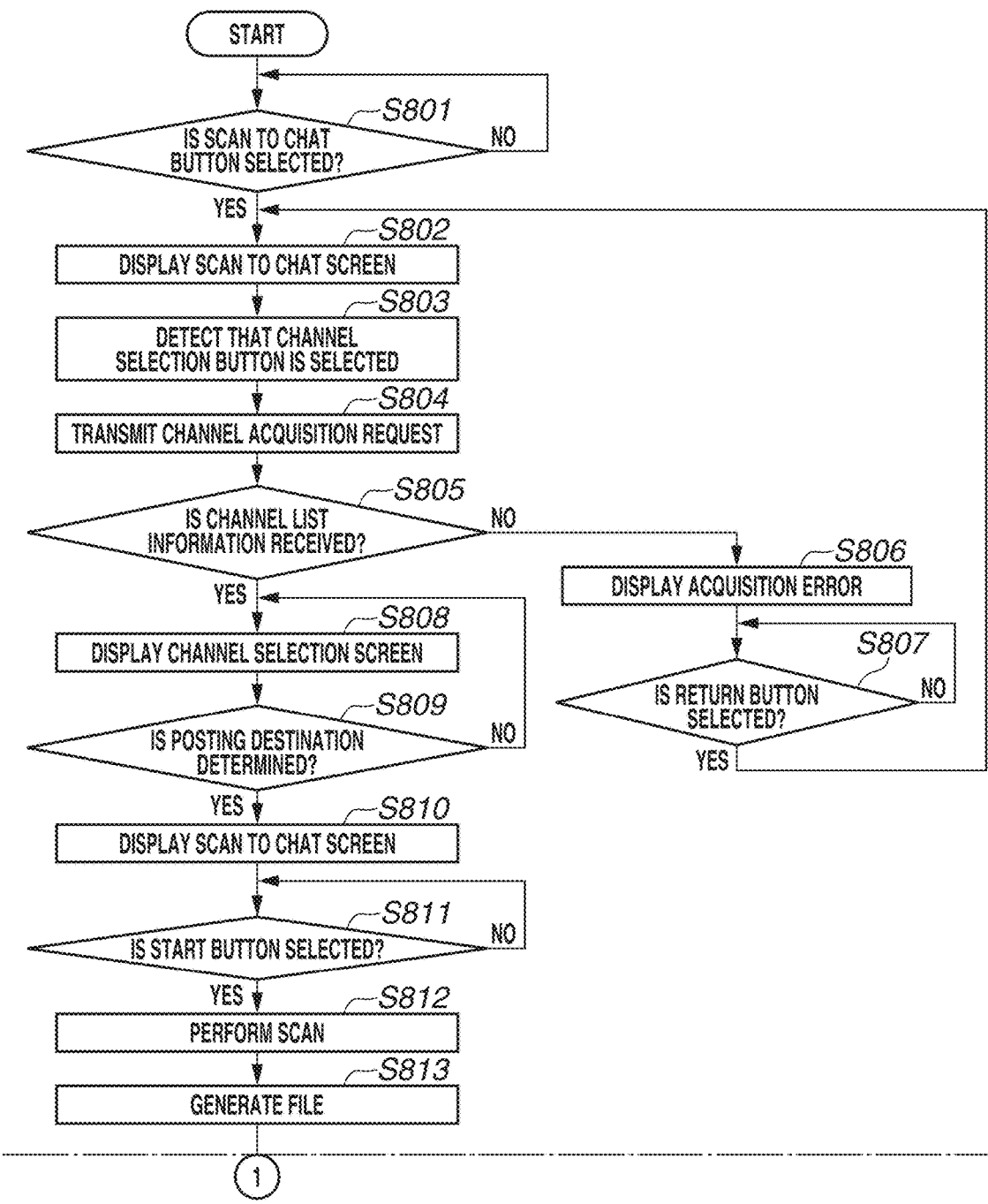
FIGS. 8A and 8B are flowcharts illustrating an example of scan to chat processing performed by the image processing apparatus.
Figure 8B:
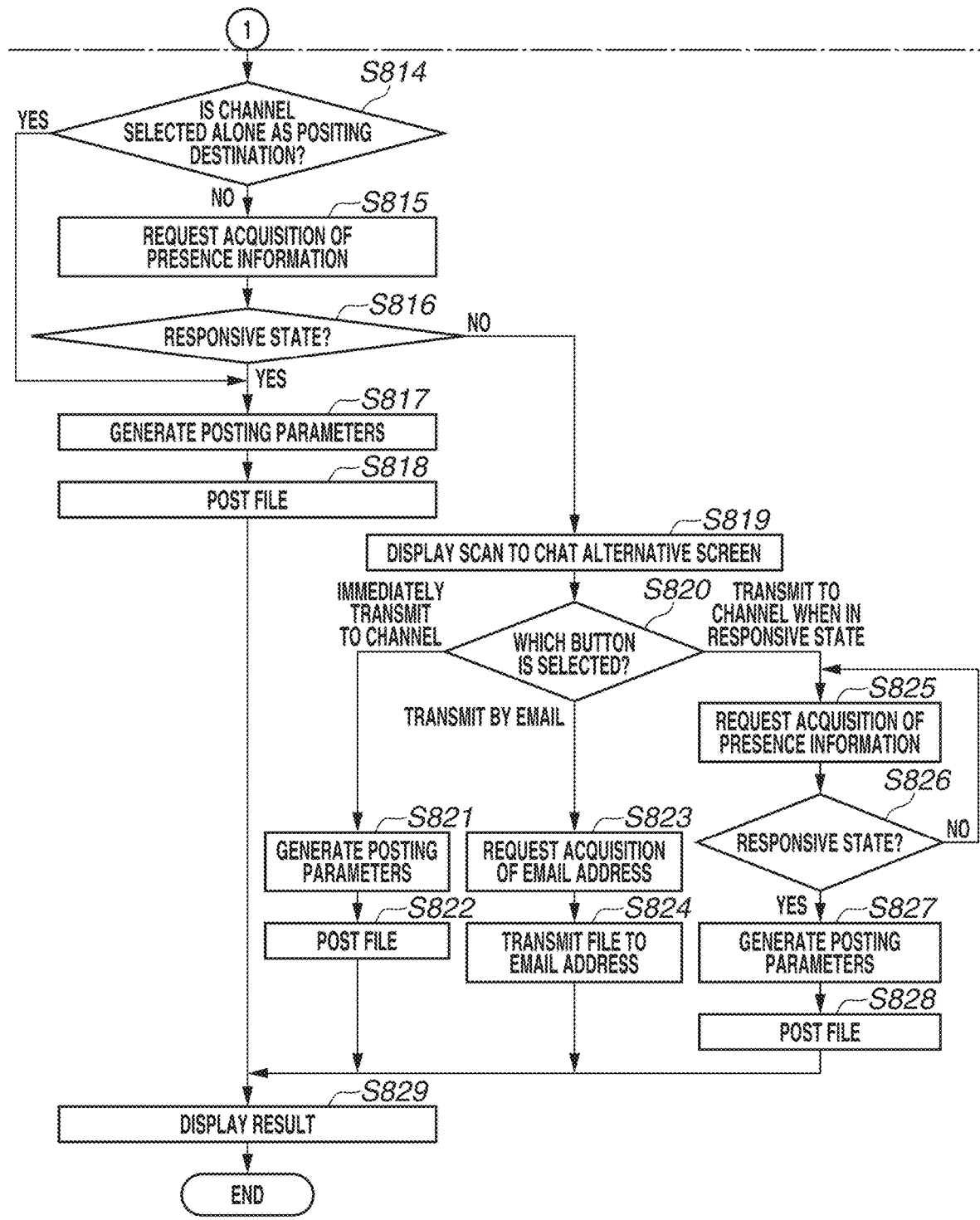

FIG. 8 is a flowchart illustrating an example of the scan to chat processing performed by the image processing apparatus 101. The processing of the flowchart of FIG. 8 is performed by the CPU 202 of the image processing apparatus 101 reading a program stored in the ROM 203 into the RAM 204 and executing the program. The procedure of FIG. 8 is started when the image processing apparatus 101 is powered on.

In step S801, the CPU 202 determines whether the scan to chat button 602 is selected. If the scan to chat button 602 is determined to be selected (YES in step S801), the processing proceeds to step S802. If not (NO in step S801), the processing returns to step S801.

In step S802, the CPU 202 displays the scan to chat screen 1201 on the touchscreen 601 of the operation unit 207. Screen transitions in the case where the scan to chat button 602 is selected will now be described with reference to FIG. 12.

FIG. 12 is a diagram illustrating examples of screen transitions in the scan to chat processing. If the scan to chat button 602 displayed on the home screen 608 is selected, the scan to chat screen 1201 is displayed on the touchscreen 601 of the operation unit 207.

The scan to chat screen 1201 displays a destination check button 1202.

The destination check button 1202 displays the number of destinations set as the posting destination(s) of image data generated by a scan. In the example of FIG. 12, one channel will be described to be selected as a posting destination. If a plurality of destinations is selected, the number of set posting destinations is displayed as the number of destinations.

If the destination check button 1202 is selected, a scan to chat destination check screen 1203 is displayed. The scan to chat destination check screen 1203 displays a posting destination or destinations set by selecting the channel selection button 1210. A posting destination button 1204 displays a posting destination set at that point in time. If the posting destination button 1204 is selected, a not-illustrated detail screen is displayed to display details of the set posting destination.

In the present exemplary embodiment, the scan to chat destination check screen 1203 displays only one posting destination. However, this is not restrictive. For example, a plurality of posting destination buttons can be displayed on the scan to chat destination check screen 1203 by the image processing apparatus 101 setting a plurality of posting destinations on the message application server 400.

If a reset button 1205 is selected on the scan to chat screen 1201, the image processing apparatus 101 clears the set information. The set destination information is thereby cleared. If a monochrome start button 1206 or a color start button 1207 is selected on the scan to chat screen 1201, the image processing apparatus 101 starts scan and transmission processing. In such a manner, the image processing apparatus 101 according to the present exemplary embodiment performs scan processing for reading a document image and processing for transmitting the image data generated by the scan processing to the message application server 400 by accepting a single execution instruction. This provides the effect of reducing the number of user operations as compared to an apparatus where an execution instruction for the scan processing and an execution instruction for the transmission processing are separately input.

If a transmission setting button 1208 is selected, the transmission setting screen 1209 is displayed. On the transmission setting screen 1209, transmission settings such as a file format 1214 can be changed and checked.

If the channel selection button 1210 is selected, the channel selection screen 1211 is displayed. The channel selection screen 1211 displays channels and users based on the channel list information that the image processing apparatus 101 receives from the message application server 400. On the channel selection screen 1211, a posting destination channel can be selected and which of the users belonging to the posting destination channel to notify can be selected. In other words, the channel to post the image data to and the user(s) to be mentioned can be selected. If a channel button is selected, the users belonging to the channel are displayed on a pull-down list. On this channel selection screen 1211, both a channel and a user may be selected. Only a channel may be selected so that the image data is posted to all the users belonging to the channel. A plurality of channels may be selected. A channel may be selected, and a plurality of users in the channel may be selected. A plurality of channels may be selected, and different users belonging to the respective channels may be selected.

If the return button 1212 is selected, the content of the channel selection is stored and the scan to chat screen 1201 is displayed again. Here, a posting destination field 1213 displays the channel name(s) of the selected channel(s) to post the image data to and the name(s) of the user(s) to be notified, like "Post to: channel3 @user 1". The CPU 202 of the image processing apparatus 101 stores the posting destination(s) based on the channel(s) and user(s) set here into the RAM 204 or the storage 205.

Return to the description of the flowchart of FIG. 8. In step S802, the CPU 202 displays the scan to chat screen 1201 of FIG. 12 on the operation unit 207. In step S803, the CPU 202 detects that the channel selection button 1210 is selected.

In step S804, in response to the selection of the channel selection button 1210, the CPU 202 performs processing for transmitting information indicating a request for channel information (channel acquisition request) to the message application server 400 by HTTP communication, using token information 1403 registered in advance.

Figure 14:
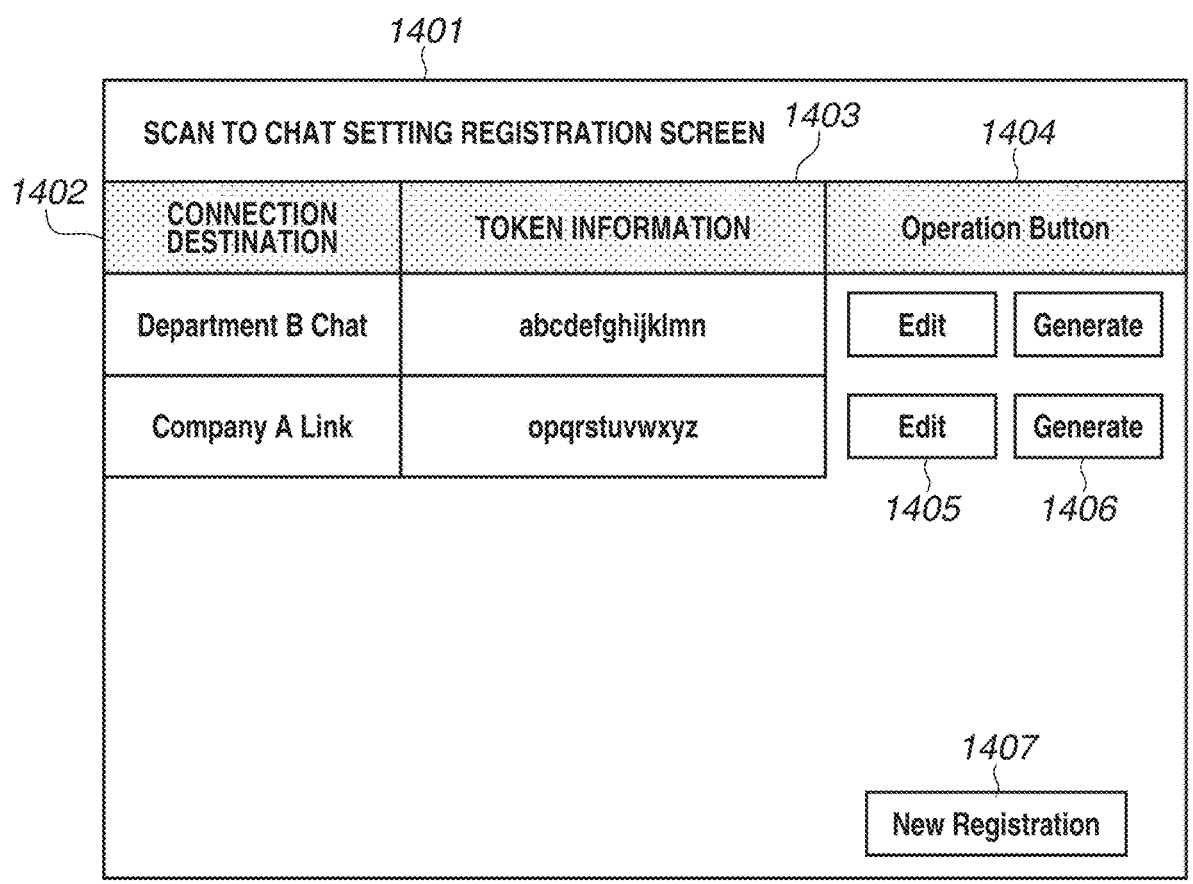
FIG. 14 is a diagram illustrating an example of a setting registration screen.

The setting registration screen 1401 of FIG. 14 will now be described. FIG. 14 is a diagram illustrating an example of the setting registration screen 1401. The setting registration screen 1401 is a screen displayed on the operation unit 207 of the image processing apparatus 101. The setting registration screen 1401 may be displayed as a webpage on an operation unit of an information processing apparatus such as a PC connected to the image processing apparatus 101 via a network. In the first exemplary embodiment, the content registered on the setting registration screen 1401 is stored in the storage 205. In a second exemplary embodiment to be described below, the content is recorded on an HDD 505.

A connection destination 1402 is a column indicating organization information about connection destinations. A token information 1403 is a column for registered token information. An operation button 1404 is a column including operation buttons. Edit buttons 1405 and generation buttons 1406 are displayed in this column.

If an edit button 1405 is selected, character strings of token information and connection destination information can be input and changed using a keyboard. If a generation button 1406 is selected, the scan to chat button 602 is set to be displayed on the home screen 608. In the first exemplary embodiment, the content registered on the setting registration screen 1401 is stored in the storage 205.

If a new registration button 1407 is selected, the user's input of character strings can be accepted to register an additional connection destination and token information. Referring back to the flowchart of FIG. 8, in step S805, the CPU 202 determines whether channel list information is received from the message application server 400 in response to the channel acquisition request transmitted in step S804. Specifically, if a status code included in the HTTP communication response information indicates an error or response body information includes a parameter indicating unavailability of information, the CPU 202 determines that the channel list information is not received. If the channel list information is determined to be received (YES in step S805), the processing proceeds to step S808. If not (NO in step S805), the processing proceeds to step S806.

In step S806, the CPU 202 displays information indicating that the channel list information is not successfully received on the channel selection screen 1211. Here, the channel selection screen 1211 does not display channel or user options.

In step S807, the CPU 202 determines whether the return button 1212 is selected. If the return button 1212 is determined to be selected (YES in step S807), the processing returns to step S802. If not (NO in step S807), the processing returns to step S807.

In step S808, the CPU 202 displays the channel selection screen 1211 displaying the channel list information received from the message application server 400 on the touchscreen 601 of the operation unit 207.

In step S809, the CPU 202 detects whether the posting destination (channel, or channel and user) selected on the channel selection screen 1211 is determined via the touchscreen 601 of the operation unit 207. If the selection is determined (YES in step S809), the processing proceeds to step S810 to update the channel list information. If not (NO in step S809), the processing proceeds to step S808. Whether the posting destination is determined is detected based on whether the return button 1212 is selected. If the channel selection screen 1211 on the operation unit 207 is configured to display a determination button and the determination button is selected, the processing transitions similarly.

In step S810, the CPU 202 displays the scan to chat screen 1201 of FIG. 12 on the operation unit 207, and updates the display of the posting destination field 1213 with the posting destination determined in step S809. Here, the information about the user to be notified is also displayed along with the posting destination channel.

In step S811, the CPU 202 determines whether the monochrome start button 1206 or the color start button 1207 displayed on the operation unit 207 is selected. If either start button is determined to be selected (YES in step S811), the processing proceeds to step S812. If not (NO in step S811), the processing returns to step S811.

In step S812, the CPU 202 controls the reading unit 209 to read a document image based on the scan settings, and generates image data. The scan settings are those specified by the user on the not-illustrated scan to chat detailed setting screen.

In step S813, the CPU 202 converts the image data generated in step S812 into the file format 1214 set on the transmission setting screen 1209.

In step S814, the CPU 202 determines whether a channel is selected alone as the posting destination in step S809 without selecting a user. If so (YES in step S814), the processing proceeds to step S817. Specifically, if a channel where a plurality of users participates is specified without specifying a mentioned user, the processing proceeds to step S817 without the CPU 202 checking the presence information about the users. If any user is selected as a posting destination (NO in step S814), the processing proceeds to step S815.

Specifically, if a one-on-one talk room is specified or if a channel where a plurality of users participates is specified and a mentioned user is specified, the processing proceeds to step S815.

In step S815, the CPU 202 issues an acquisition request for the presence information about the posting destination determined in step S809 to the message application server 400 by the GET method of HTTP communication using the token information 1403 registered in advance.

In the present exemplary embodiment, a start button is pressed in step S811, a scan is performed in step S812, and the file is generated in step S813 before the presence information is acquired in step S815. However, this is not restrictive. For example, the start button may be pressed and the presence information may be acquired before the scan is performed and the file is generated.

In step S816, if the presence information about the posting destination acquired in step S815 indicates a responsive state (YES in step S816), the processing proceeds to step S817. If the presence information indicates an unresponsive state (NO in step S816), the processing proceeds to step S820.

In step S817, the CPU 202 generates posting parameters. The posting parameters include the posting destination channel, the file format, the filename, and a posting comment. The file format corresponding to the file format 1214 set on the transmission setting screen 1209 is set as the file format. The posting comment is a character string generated by attaching an at sign "@" to the beginning of the user information about the user to be notified (mentioned). The filename specified by the transmission settings is specified as the filename.

In step S818, the CPU 202 transmits the file generated in step S813 and the posting parameters generated in step S817 to the message application server 400 by the POST method of HTTP communication using the token information 1403 registered in advance. If such data (the file into which the image data is converted and the posting parameters) is transmitted to the message application server 400, the message application server 400 controls posting of the received file to the specified user on the specified channel.

In step S819, the CPU 202 displays the scan to chat alternative screen 1301 on the touchscreen 601 of the operation unit 207.

In step S820, if the button 1302 is selected on the scan to chat alternative screen 1301 (IMMEDIATELY TRANSMIT TO CHANNEL in step S820), the processing proceeds to step S821. If the button 1303 is selected on the scan to chat alternative screen 1301 (TRANSMIT BY EMAIL in step S820), the processing proceeds to step S823. If the button 1304 is selected on the scan to chat alternative screen 1301 (TRANSMIT TO CHANNEL WHEN IN RESPONSIVE STATE in step S820), the processing proceeds to step S825.

The processing of steps S821 and S822 is similar to that of steps S817 and S818. A description thereof will thus be omitted.

In step S823, the CPU 202 issues an acquisition request for the email address of the posting destination determined in step S809 to the message application server 400 by the GET method of HTTP communication using the token information 1403 registered in advance.

In step S824, the CPU 202 transmits the file generated in step S813 to the email address of the posting destination acquired in step S823.

The processing of step S825 is similar to that of step S815. A description thereof will thus be omitted.

In step S826, if the presence information about the posting destination acquired in step S825 indicates a responsive state (YES in step S826), the processing proceeds to step S827. If the presence information indicates an unresponsive state (NO in step S826), the processing returns to step S825.

The processing of steps S827 and S828 is similar to that of steps S817 and S818. A description thereof will thus be omitted.

In step S829, the CPU 202 receives the result of the posting or transmission of the file from the message application server 400 or the not-illustrated mail server. The CPU 202 displays the result on the touchscreen 601 of the operation unit 207.

According to the present exemplary embodiment, the user can select appropriate options based on the presence information in transmitting the file from the image processing apparatus 101 to a channel on the message application server 400. The execution of the foregoing processing can make the posting of the image data more noticeable to the transmission destination user.

In the first exemplary embodiment, the image processing apparatus 101 is described to directly transmit the image data and the posting parameters to the message application server 400. A second exemplary embodiment describes an example where an image processing apparatus 101 transmits image data and posting parameters to a message application server 400 via a bot server 500.

Figure 9B:
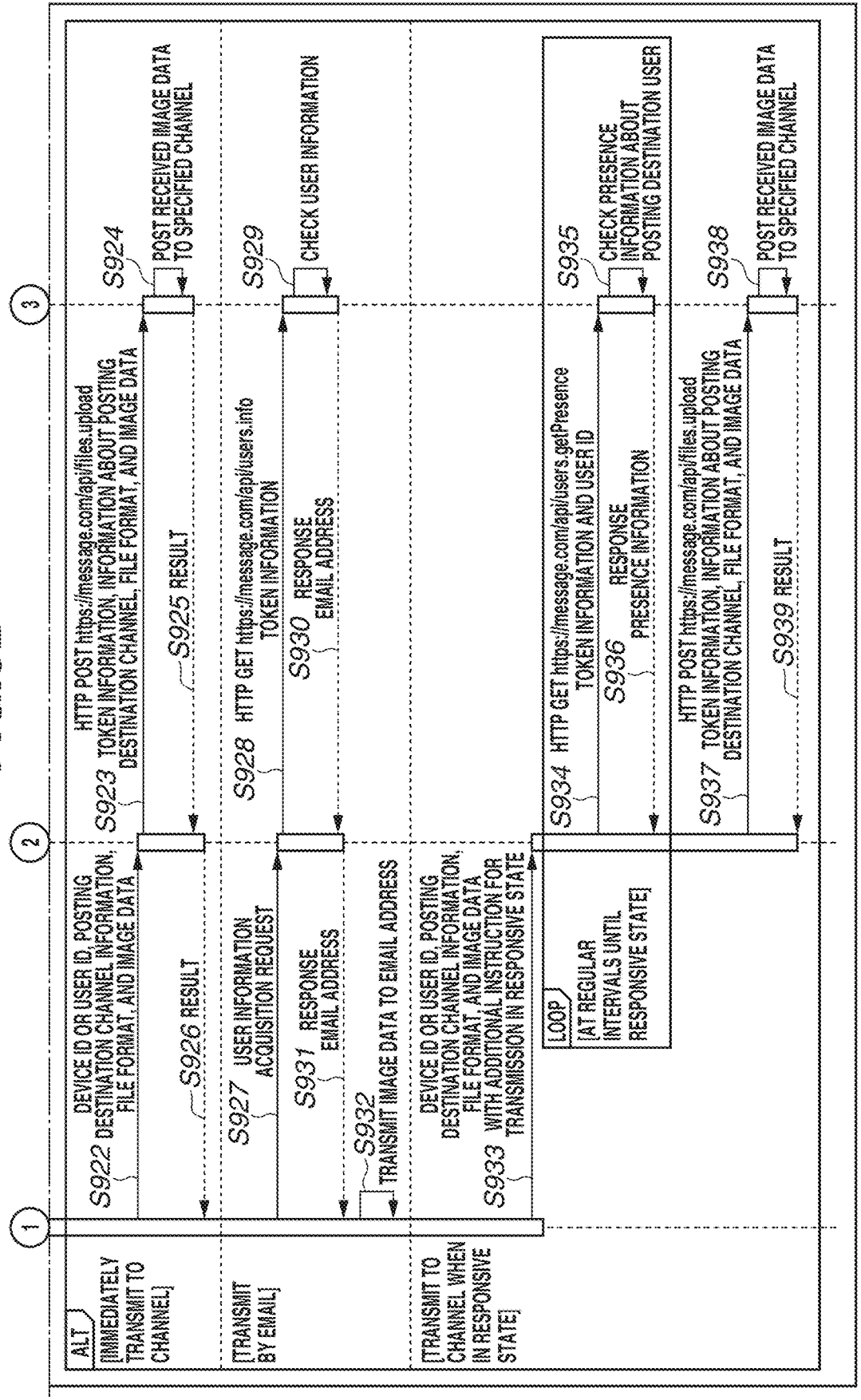

FIG. 9 is a diagram illustrating an example of a sequence where the image processing apparatus 101 transmits a file generated by a scan to the message application server 400 via the bot server 500.

In step S901, a CPU 202 of the image processing apparatus 101 requests channel list information from the bot server 500 by HTTP communication with a device ID or user ID as a parameter.

In step S902, a CPU 501 of the bot server 500 transmits information indicating the request for the channel list information to the message application server 400 by HTTP information using token information. Token information corresponding to the device ID or user ID received in step S901 is acquired as the token information.

In step S903, a CPU 401 of the message application server 400 checks whether the access to the URL is permitted based on the token information. If the access to the URL is permitted, the CPU 401 generates channel list information about channels included in the workspace corresponding to the token information. The channel list information is array information indicating channel information. Each piece of channel information includes a channel ID, a channel name, information indicating users participating in the channel, and a channel setting value indicating a setting as to whether the channel is an archive channel.

In step S904, the CPU 401 of the message application server 400 controls the communication unit 404 to transmit the channel list information to the bot server 500 as HTTP communication response information.

In step S905, the CPU 501 of the bot server 500 transmits the channel list information received in step S904 to the image processing apparatus 101 as HTTP communication response information.

The processing of steps S906 to S910 is similar to that of steps S704 to S708 in FIG. 7. A description thereof will thus be omitted.

In step S911, the CPU 202 of the image processing apparatus 101 issues a presence information acquisition request to the bot server 500 by HTTP communication with the device ID or user ID and posting destination channel information as parameters.

In step S912, the CPU 501 issues a presence information acquisition request to the message application server 400 with the posting destination channel information and the device ID or user ID received and token information corresponding to the device ID or user ID as parameters. Here, the CPU 501 determines the token information to be transmitted by referring to a table where device IDs or user IDs and token information are associated with each other, stored in the HDD 505.

The processing of step S913 is similar to that of step S710. A description thereof will thus be omitted.

In step S914, the CPU 401 transmits a result corresponding to whether the presence information about the posting destination user is successfully acquired and, if the acquisition is successful, the presence information about the posting destination user to the bot server 500 as HTTP communication response information.

In step S915, the CPU 501 of the bot server 500 transmits the presence information received in step S914 to the image processing apparatus 101 as HTTP communication response information.

If the image processing apparatus 101 successfully acquires the presence information from the bot server 500 in step S915 and the presence information indicates a responsive state, the processing of steps S916 to S920 is performed. If the image processing apparatus 101 successfully acquires the presence information from the bot server 500 in step S915 and the presence information indicates an unresponsive state, the processing of step S921 is performed. The processing of step S921 is also performed if the image processing apparatus 101 fails to acquire the presence information from the bot server 500 in step S915. The processing of steps S922 to S926, S927 to S932, or S933 to S939 is then performed.

In step S916, the CPU 202 of the image processing apparatus 101 transmits the device ID or user ID, the posting destination channel information, the information indicating the file format, and the image data to the bot server 500 by HTTP communication.

In step S917, the CPU 501 of the bot server 500 performs processing for transmitting the posting channel information, the information about the file format, and the image data received, and token information corresponding to the received device ID or user ID to the message application server 400.

Here, the CPU 501 determines the token information to be transmitted by referring to the table where device IDs or user IDs and token information are associated with each other, stored in the HDD 505.

The processing of step S918 is similar to that of step S713. A description thereof will thus be omitted.

In step S919, the CPU 401 of the message application server 400 transmits a result corresponding to whether the posting is successful to the bot server 500 as HTTP communication response information.

In step S920, the CPU 501 of the bot server 500 transmits the result corresponding to whether the posting is successful to the image processing apparatus 101 as HTTP communication response information. If the posting is successful, the CPU 202 of the image processing apparatus 101 may display a notification that the posting is successful on the operation unit 207. If the posting is failed, the CPU 202 of the image processing apparatus 101 may display a notification that the posting is failed on the operation unit 207. The CPU 202 may display no notification if the posting is successful, and only display a notification of the posting failure if the posting is failed.

The processing of step S921 is similar to that of step S715. A description thereof will thus be omitted.

If the button 1302 is selected on the scan to chat alternative screen 1301, the processing of steps S922 to S926 is performed. The processing of steps S922 to S926 is similar to that of steps S916 to S920. A description thereof will thus be omitted.

If the button 1303 is selected on the scan to chat alternative screen 1301, the processing of steps S927 to S932 is performed.

In step S927, the CPU 202 of the image processing apparatus 101 issues a user information acquisition request to the bot server 500 by HTTP communication with the device ID or user ID and the posting destination channel information as parameters.

In step S928, the CPU 501 issues a user information acquisition request to the message application server 400 with the posting destination channel information and the device ID or user ID received and token information corresponding to the device ID or user ID as parameters. Here, the CPU 501 determines the token information to be transmitted by referring to the table where device IDs or user IDs and token information are associated with each other, stored in the HDD 505.

The processing of step S929 is similar to that of step S720. A description thereof will thus be omitted.

In step S930, the CPU 401 transmits a result corresponding to whether the user information about the posting destination user is successfully acquired and, if the acquisition is successful, the email address included in the user information about the posting destination user to the bot server 500 as HTTP communication response information.

In step S931, the CPU 501 transmits the result corresponding to whether the user information about the posting destination user is successfully acquired and, if the acquisition is successful, the email address included in the user information about the posting destination user, received in step S930, to the image processing apparatus 101 as HTTP communication response information. If the user information is successfully acquired, the CPU 202 of the image processing apparatus 101 may display a notification that the user information is successfully acquired on the operation unit 207. If the user information fails to be acquired, the CPU 202 of the image processing apparatus 101 may display a notification that the user information fails to be acquired on the operation unit 207. The CPU 202 may display no notification if the user information is successfully acquired, and only display a notification that the user information fails to be acquired if the acquisition is failed.

The processing of step S932 is similar to that of step S722. A description thereof will thus be omitted.

If the button 1304 is selected on the scan to chat alternative screen 1301, the processing of steps S933 to S939 is performed.

In step S933, the CPU 202 of the image processing apparatus 101 transmits the device ID or user ID, the posting destination channel information, the information indicating the file format, and the image data to the bot server 500 by HTTP communication, along with an additional instruction for transmission in a responsive state.

In steps S934 to S936, the presence information about the posting destination user is repeatedly acquired at regular intervals until the presence information indicates a responsive state. The processing of steps S934 to S936 is similar to that of steps S912 to S914. A description thereof will thus be omitted.

If the presence information about the posting destination user indicates a responsive state in step S936, the processing of steps S937 to S939 is performed. The processing of steps S937 to S939 is similar to that of steps S917 to S919. A description thereof will thus be omitted.

Figure 10A:
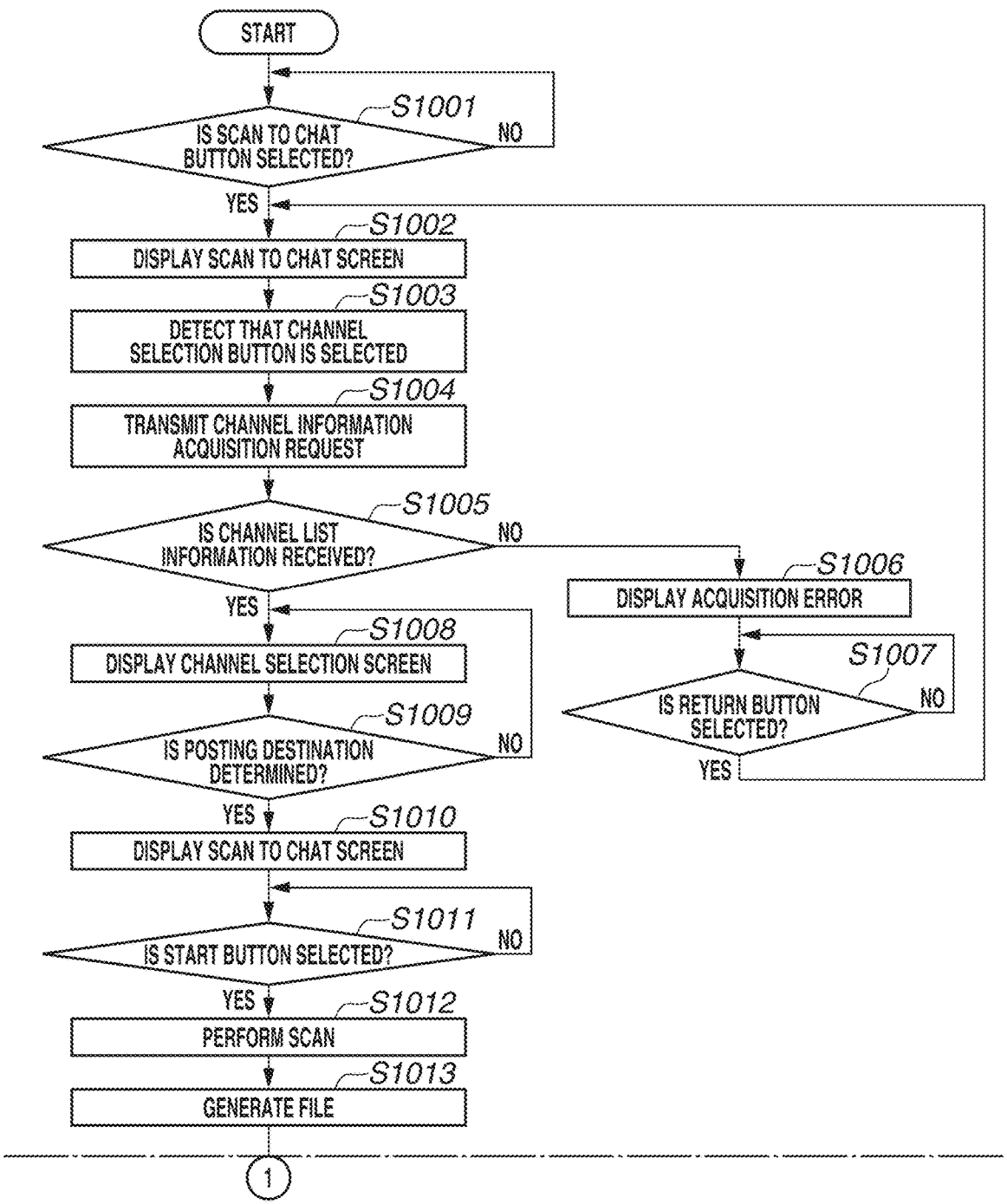
FIGS. 10A and 10B are flowcharts illustrating an example of scan to chat processing.
Figure 10B:
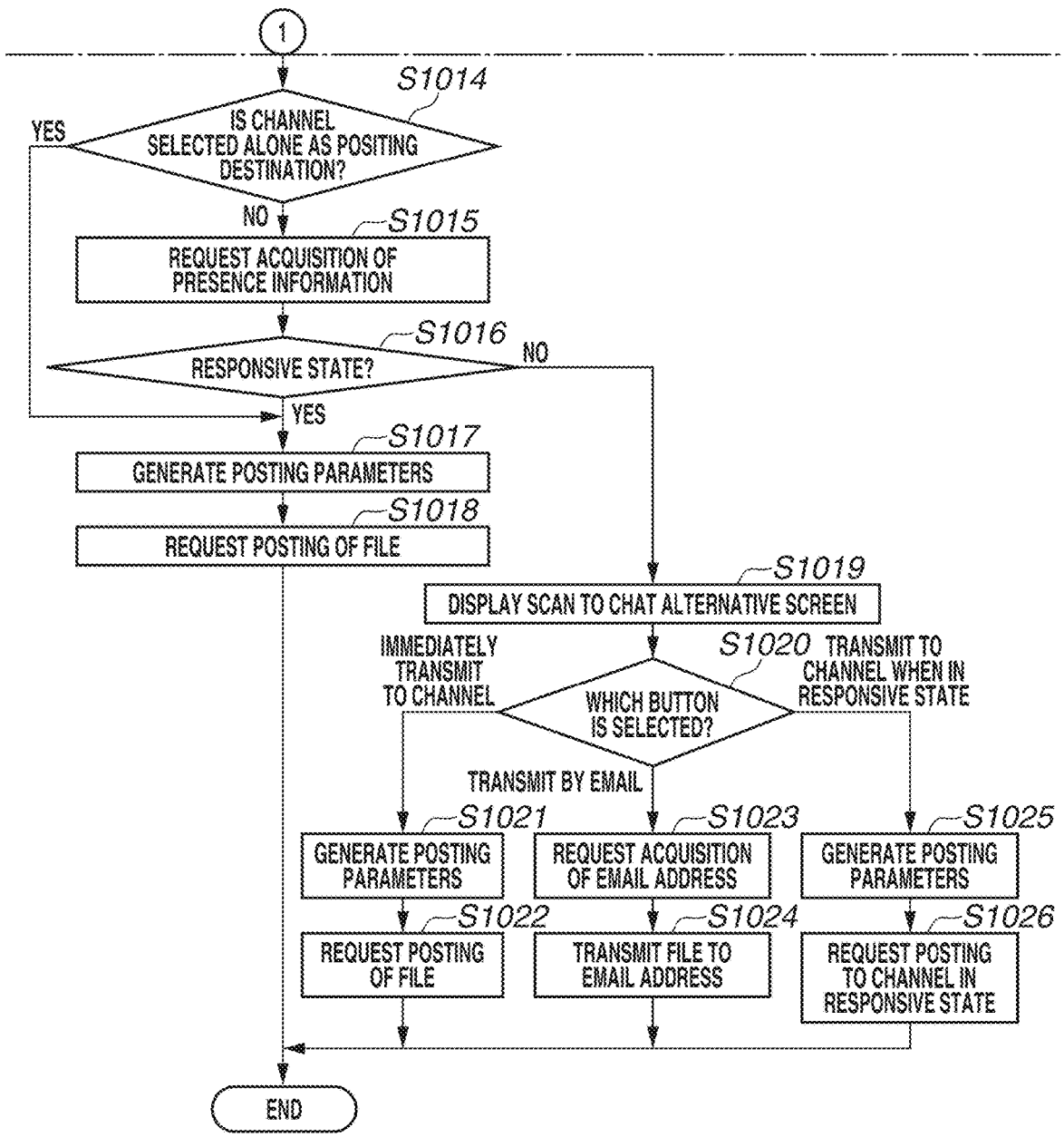

FIG. 10 is a flowchart illustrating an example of the scan to chat processing. The processing of the flowchart in FIG. 10 is performed by the CPU 202 reading a program stored in the ROM 203 into the RAM 204 and executing the program. The procedure of FIG. 10 is started when the image processing apparatus 101 is powered on.

The processing of steps S1001 to S1003 is similar to that of steps S801 to S803. A description thereof will thus be omitted.

In step S1004, the CPU 202 acquires the user ID of the user logged in to the image processing apparatus 101 or the device ID of the image processing apparatus 101, and transmits a channel information acquisition request and the user ID or device ID to the bot server 500 by HTTP communication.

The processing of steps S1005 to S1013 is similar to that of steps S805 to S813. A description thereof will thus be omitted.

In step S1014, if a channel is selected alone as the posting destination in step S1009 without selecting a user (YES in step S1014), the processing proceeds to step S1017. If a user is selected as the posting destination in step S1009 (NO in step S1014), the processing proceeds to step S1015.

In step S1015, the CPU 202 transmits the user ID of the user logged in to the image processing apparatus 101 or the device ID of the image processing apparatus 101, the posting destination information determined in step S1009, and a presence information acquisition request to the bot server 500 by HTTP communication.

In step S1016, if the presence information about the posting destination acquired in step S1015 indicates a responsive state (YES in step S1016), the processing proceeds to step S1017. If the presence information indicates an unresponsive state (NO in step S1016), the processing proceeds to step S1019.

The processing of step S1017 is similar to that of step S817. A description thereof will thus be omitted.

In step S1018, the CPU 202 transmits the user ID of the user logged in to the image processing apparatus 101 or the device ID of the image processing apparatus 101, the file generated in step S1013, and the posting parameters generated in step S1107 to the bot server 500.

The processing of step S1019 is similar to that of step S819. A description thereof will thus be omitted.

In step S1020, if the button 1302 is selected on the scan to chat alternative screen 1301 (IMMEDIATELY TRANSMIT TO CHANNEL in step S1020), the processing proceeds to step S1012. If the button 1303 is selected on the scan to chat alternative screen 1301 (TRANSMIT BY EMAIL in step S1020), the processing proceeds to step S1023. If the button 1304 is selected on the scan to chat alternative screen 1301 (TRANSMIT TO CHANNEL WHEN IN RESPONSIVE STATE in step S1020), the processing proceeds to step S1025.

The processing of steps S1021 and S1022 is similar to that of steps S1017 and S1018. A description thereof will thus be omitted.

In step S1023, the CPU 202 transmits the user ID of the user logged in to the image processing apparatus 101 or the device ID of the image processing apparatus 101, the posting destination information determined in step S1009, and an email address acquisition request to the bot server 500 by HTTP communication.

The processing of step S1024 is similar to that of step S824. A description thereof will thus be omitted.

The processing of step S1025 is similar to that of step S1017. A description thereof will thus be omitted.

In step S1026, the CPU 202 transmits the user ID of the user logged in to the image processing apparatus 101 or the device ID of the image processing apparatus 101 and the file generated in step S1013 to the bot server 500 along with an additional instruction. This instruction is to cause transmission of the posting parameters generated in step S1017 when in a responsive state.

Figure 11A:
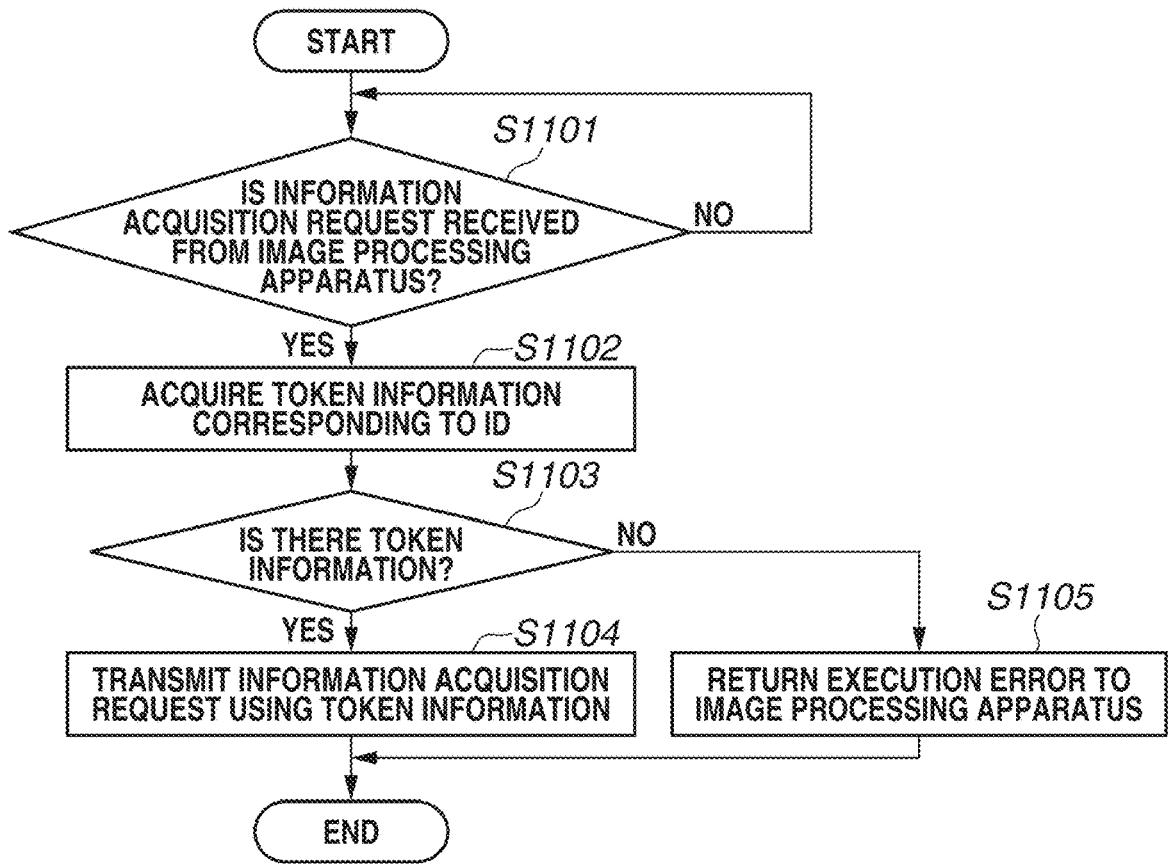
FIG. 11A is a flowchart illustrating an example of processing where the bot server acquires an identifier (ID) and channel information from the message application server.
Figure 11B:
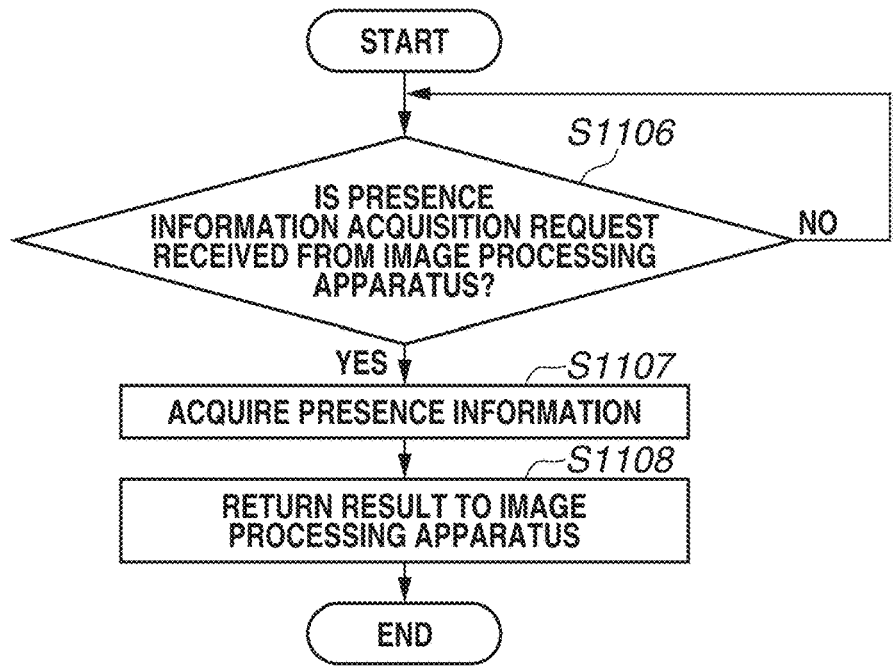
FIG. 11B is a flowchart illustrating an example of processing where the bot server acquires presence information from the message application server.
Figure 11C:
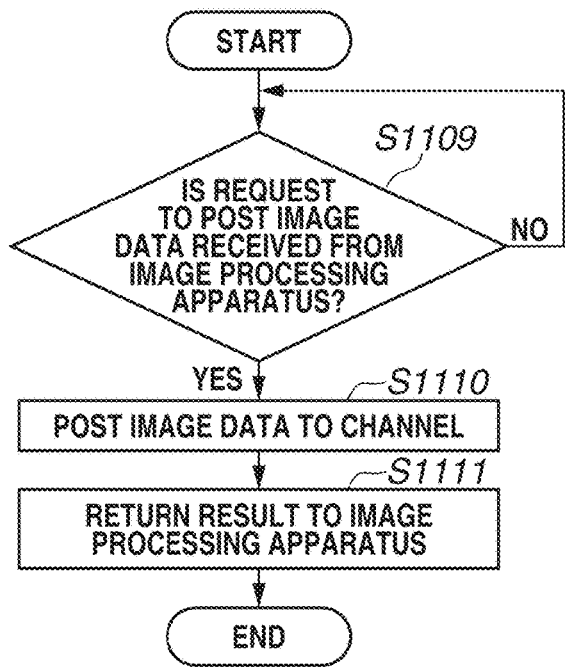
FIG. 11C is a flowchart illustrating an example of processing where the bot server transmits image data to the message application server.
Figure 11D:
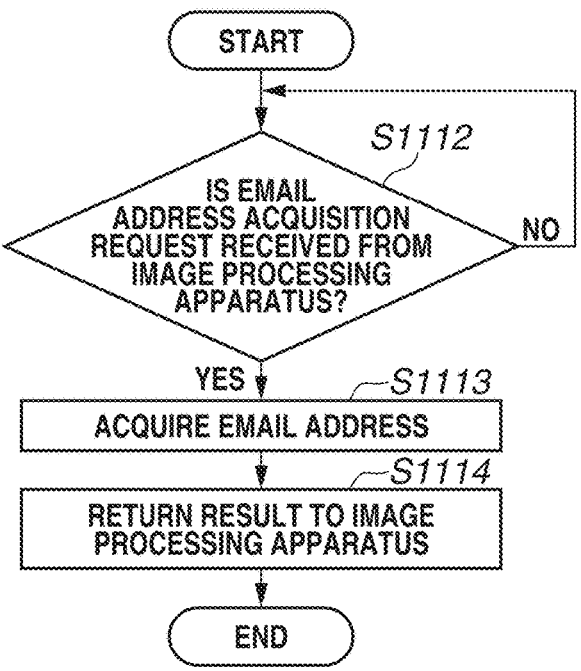
FIG. 11D is a flowchart illustrating an example of processing where the bot server acquires an email address from the message application server.
Figure 11E:
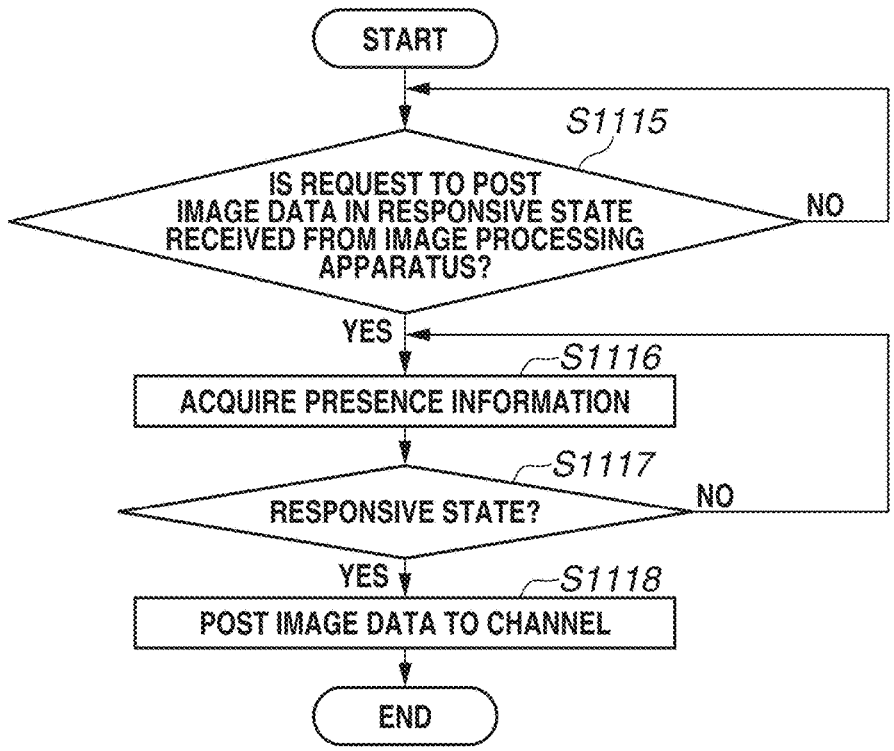
FIG. 11E is a flowchart illustrating an example of processing where the bot server acquires presence information from the message application server and, if the presence information indicates a responsive state, transmits image data to the message application server.

FIGS. 11A to 11E are flowcharts illustrating examples of processing by the bot server 500 in the scan to chat processing. FIG. 11A is a flowchart illustrating an example of processing where the bot server 500 acquires an ID and channel information from the message application server 400. FIG. 11B is a flowchart illustrating an example of processing where the bot server 500 acquires presence information from the message application server 400. FIG. 11C is a flowchart illustrating an example of processing where the bot server 500 transmits image data to the message application server 400. FIG. 11D is a flowchart illustrating an example of processing where the bot server 500 acquires an email address from the message application server 400. FIG. 11E is a flowchart illustrating an example of processing where the bot server 500 transmits image data to the message application server 400 when in a responsive state. The processing of FIGS. 11A, 11B, 11C, 11D, and 11E is performed by the CPU 501 reading programs stored in the ROM 502 into the RAM 503 and executing the programs. The procedures of FIGS. 11A, 11B, 11C, 11D, and 11E are started when the bot server 500 is powered on.

First, the example of the processing where the bot server 500 acquires an ID and channel information from the message application server 400 will be described with reference to FIG. 11A.

In step S1101, the CPU 501 determines whether an information acquisition request to acquire a device ID or user ID and channel information is received from the image processing apparatus 101. If the information acquisition request is determined to be received (YES in step S1101), the processing proceeds to step S1102. If not (NO in step S1101), the processing returns to step S1101.

In step S1102, the CPU 501 acquires token information corresponding to the device ID or user ID received from the image processing apparatus 101.

In step S1103, the CPU 501 determines whether there is token information corresponding to the received device ID or user ID. If there is determined to be such token information (YES in step S1103), the processing proceeds to step S1104. Here, the CPU 501 stores the token information corresponding to the received device ID or user ID into the RAM 503.

If not (NO in step S1103), the processing proceeds to step S1105.

In step S1104, the CPU 501 transmits the information acquisition request received from the image processing apparatus 101 to the message application server 400 using the token information identified in step S1103. The CPU 501 transmits information returned from the message application server 400 in response to the transmission to the image processing apparatus 101.

In step S1105, the CPU 501 transmits information indicating an execution error to the image processing apparatus 101 as a response to the request received in step S1101.

Next, the example of the processing where the bot server 500 acquires presence information from the message application server 400 will be described with reference to FIG. 11B.

In step S1106, the CPU 501 determines whether a presence information acquisition request is received from the image processing apparatus 101. If a presence information acquisition request is determined to be received (YES in step S1106), the processing proceeds to step S1107. If not (NO in step S1106), the processing returns to step S1106.

In step S1107, the CPU 501 issues a presence information acquisition request to the message application server 400 by the GET method of HTTP communication. Here, the posting destination channel information received from the image processing apparatus 101 and the user ID of the user logged in to the image processing apparatus 101 or the device ID of the image processing apparatus 101 are specified. The posting destination information determined in step S1009 is also specified.

In step S1108, the CPU 501 transmits the result as to whether the presence information is successfully acquired from the message application server 400 in step S1107 and, if the acquisition is successful, the presence information to the image processing apparatus 101.

Next, the example of the processing where the bot server 500 transmits image data to the message application server 400 will be described with reference to FIG. 11C.

In step S1109, the CPU 501 determines whether a request to post image data is received from the image processing apparatus 101. If the request is determined to be received (YES in step S1109), the processing proceeds to step S1110. If not (NO in step S1109), the processing returns to step S1109.

In step S1110, the CPU 501 transmits the following information to the message application server 400. The information to be transmitted includes, for example, the posting destination channel information received from the image processing apparatus 101, the user ID of the user logged in to the image processing apparatus 101 or the device ID of the image processing apparatus 101, the image data, and the posting parameters.

In step S1111, the CPU 501 transmits, to the image processing apparatus 101, the result corresponding to whether the image data is successfully posted to the message application server 400.

Next, the example of the processing where the bot server 500 acquires an email address from the message application server 400 will be described with reference to FIG. 11D.

In step S1112, the CPU 501 determines whether an email address acquisition request is received from the image processing apparatus 101. If an email address acquisition request is determined to be received (YES in step S1112), the processing proceeds to step S1113. If not (NO in step S1112), the processing returns to step S1112.

In step S1113, the CPU 501 issues an email address acquisition request to the message application server 400 by the GET method of HTTP communication. Here, the posting destination channel information received from the image processing apparatus 101 and the user ID of the user logged in to the image processing apparatus 101 or the device ID of the image processing apparatus 101 are specified. The posting destination information determined in step S1009 is also specified.

In step S1114, the CPU 501 transmits the result as to whether an email address is successfully acquired from the message application server 400 in step S1113 and, if the acquisition is successful, the email address to the image processing apparatus 101.

Next, the example of the processing where the bot server 500 acquires presence information from the message application server 400 and transmits the image data to the message application server 400 when in a responsive state will be described with reference to FIG. 11E.

In step S1115, the CPU 501 determines whether a request to post image data in a responsive state is received from the image processing apparatus 101. If the request is determined to be received (YES in step S1115), the processing proceeds to step S1116. If not (NO in step S1115), the processing returns to step S1115.

The processing of step S1116 is similar to that of step S1107. A description thereof will thus be omitted.

In step S1117, if the presence information received from the message application server 400 in step S1116 is determined to indicate a responsive state (YES in step S1117), the processing proceeds to step S1118. If not (NO in step S1117), the processing returns to step S1116.

The processing of step S1118 is similar to that of step S1110. A description thereof will thus be omitted.

According to the present exemplary embodiment, even if the interface specifications of the message application server 400 are changed, the chat service can be implemented by simply updating the programs of the bot server 500 without updating the programs of the image processing apparatus 101. In an office where there is a plurality of image processing apparatuses, files can be posted without individually setting a token for each of the image processing apparatuses. Moreover, the presence check of the transmission destination and the chat transmission can be continued even if the image processing apparatus 101 enters a power saving mode or is powered off.

The execution of the foregoing processing can make the posting of the image data more noticeable to the transmission destination user when the image processing apparatus 101 posts the image data generated by reading a document image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-180026, filed Nov. 10, 2022, which is hereby incorporated by reference herein in its entirety.

What is claimed is:

1. A scan apparatus comprising:
   a scanner that scans a document and generates image data; and
   one or more memories storing instructions; and
   one or more processors executing the instructions to:
   receive status information indicating a status of a user from a chat server, transmit the image data generated by the scanner and information about a posting destination to the chat server, wherein the image data transmitted by the scan apparatus is posted to a posting destination, the posting destination being of a chat service provided by the chat server, wherein the one or more processors, while the status of a user corresponding to the posting destination is offline, does not transmit the image data or the information, the status being indicated by the received status information, and wherein the one or more processors, in response to reception of status information indicating a responsive status of the user corresponding to the posting destination after the one or more processors receives status information indicating an offline status of the user corresponding to the posting destination, transmits the image data and the information to the chat server without receiving a transmission instruction by a user after the one or more processors receives the status information indicating the offline status.

2. The scan apparatus according to claim 1,
wherein the posting destination is a talk room where the user participates, and
wherein the image data transmitted by the one or more processors is posted to the talk room corresponding to the information transmitted by the one or more processors.

3. The scan apparatus according to claim 1, wherein the status of the user is that of the user in the chat service.

4. The scan apparatus according to claim 1, wherein the one or more processors accepts a user's selection of the posting destination from among a plurality of posting destinations,
wherein the one or more processors receives information about the plurality of posting destinations from the chat server,
wherein the one or more processors transmits the image data and information about the selected posting destination to the chat server, and
wherein the one or more processors receives status information indicating the status of the user corresponding to the selected posting destination.

5. The scan apparatus according to claim 1, further comprising a display that, when the transmission instruction for the one or more processors to transmit the image data to the chat server is issued, display a selection screen based on a fact that the status of the user corresponding to the posting destination is offline, the status being indicated by the received status information,
wherein the one or more processors, in a case where a first object is selected on the selection screen, does not transmit the image data or the information while the status of the user corresponding to the posting destination is offline, the status being indicated by the received status information, and transmits the image data and the information when the one or more processors receives the status information indicating the responsive status of the user corresponding to the posting destination, and
wherein the one or more processors, if a second object is selected on the selection screen, transmit the image data by email.

6. The scan apparatus according to claim 5, wherein the one or more processors, in a case where the second object is selected on the selection screen, transmits the image data to an email address corresponding to the user corresponding to the posting destination by email.

7. The scan apparatus according to claim 6, wherein the email address is one received from the chat server by the one or more processors.

8. The scan apparatus according to claim 1, wherein the user corresponding to the posting destination is a user to share the image data with.

9. The scan apparatus according to claim 1, wherein the user corresponding to the posting destination is a user specified as a mentioned user of posting of the image data.

10. The scan apparatus according to claim 1, further comprising a display, wherein while the status of the user corresponding to the posting destination is offline, the one or more processors display an option to accept a transmission request of image data on the display.

11. The scan apparatus according to claim 1, wherein in a case that the posting destination is a channel, the communicator sends the image data to the chat server regardless of the status of the user, in a case that the posting destination is not a channel, the communicator sends the image data to the chat server when the status of the user is the responsive status.

12. The scan apparatus according to claim 11, wherein the channel is used for multiple users to exchange messages.

13. An image processing method comprising:
scanning a document and generating image data;
receiving status information indicating a status of a user from a chat server; and
transmitting the generated image data and information about a posting destination to the chat server,
wherein the transmitted image data is posted to the posting destination corresponding to the transmitted information, the posting destination being of a chat service provided by the chat server,
wherein neither the image data nor the information is transmitted while the status of a user corresponding to the posting destination is offline, the status being indicated by the received status information, and
wherein, in response to reception of status information indicating a responsive status of the user corresponding to the posting destination after receiving status information indicating an offline status of the user corresponding to the positing destination, the image data and the information are transmitted to the chat server without receiving a transmission instruction by a user after receiving the status information indicating the offline status.

14. A non-transitory storage medium storing a program for causing a computer to perform an image processing method, the image processing method comprising:
scanning a document and generating image data;
receiving status information indicating a status of a user from a chat server; and
transmitting the generated image data and information about a posting destination to the chat server,
wherein the transmitted image data is posted to the posting destination corresponding to the transmitted information, the posting destination being of a chat service provided by the chat server,
wherein neither the image data nor the information is transmitted while the status of a user corresponding to the posting destination is offline, the status being indicated by the received status information, and
wherein, in response to reception of status information indicating a responsive status of the user corresponding to the posting destination after receiving status information indicating an offline status of the user corresponding to the posting destination, the image data and the information are transmitted to the chat server without receiving a transmission instruction by a user after receiving the status information indicating the offline status.

\* \* \* \* \*